(12) United States Patent
Abbasipour et al.

(10) Patent No.: US 9,164,734 B2
(45) Date of Patent: Oct. 20, 2015

(54) ONTOLOGY-BASED USER REQUIREMENT DECOMPOSITION FOR COMPONENT SELECTION FOR SERVICE PROVISION

(71) Applicants: Mahin Abbasipour, Montreal (CA); Margarete Sackmann, Montreal (CA); Maria Toeroe, Montreal (CA); Ferhat Khendek, Montreal (CA)

(72) Inventors: Mahin Abbasipour, Montreal (CA); Margarete Sackmann, Montreal (CA); Maria Toeroe, Montreal (CA); Ferhat Khendek, Montreal (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 68 days.

(21) Appl. No.: 14/103,384

(22) Filed: Dec. 11, 2013

(65) Prior Publication Data

US 2014/0101634 A1  Apr. 10, 2014

Related U.S. Application Data

(63) Continuation-in-part of application No. 13/342,767, filed on Jan. 3, 2012, now Pat. No. 8,683,424.

(60) Provisional application No. 61/904,614, filed on Nov. 15, 2013.

(51) Int. Cl.
| | |
|---|---|
| *G06F 7/48* | (2006.01) |
| *G06F 11/30* | (2006.01) |
| *G06F 12/14* | (2006.01) |
| *G06F 9/44* | (2006.01) |
| *G06F 9/45* | (2006.01) |

(52) U.S. Cl.
CPC ........................................ *G06F 8/10* (2013.01)

(58) Field of Classification Search
CPC ....... G06F 17/30371; G06F 8/10; G06F 8/20; G06F 8/35; G06F 8/38; G06F 8/34; G06F 21/54; G06F 11/3604; G06F 8/30; G06F 8/36; G06Q 10/06
See application file for complete search history.

(56) References Cited

U.S. PATENT DOCUMENTS

| 7,424,701 | B2 * | 9/2008 | Kendall et al. ................ 717/105 |
|---|---|---|---|
| 8,522,195 | B2 * | 8/2013 | Miloslavsky et al. ......... 717/104 |
| 2002/0108099 | A1 * | 8/2002 | Paclat ............................ 717/102 |
| 2003/0005412 | A1 * | 1/2003 | Eanes ........................... 717/120 |

(Continued)

OTHER PUBLICATIONS

Nizamuddin Channa et al, Constraint Satisfaction in Dynamic Web service Composition, Sixteenth International Workshop on Database and Expert Systems Applications, 2005, pp. 658-664.

(Continued)

*Primary Examiner* — Don Wong
*Assistant Examiner* — Anibal Rivera
(74) *Attorney, Agent, or Firm* — Alex Nicolaescu; Ericsson Canada Inc.

(57) ABSTRACT

Configuration requirements that specify the provision of services using a system-level description are automatically generated from user requirements. The user requirements are decomposed into one or more levels of decomposed functionalities using an ontology as input. The ontology stores known decompositions of functionalities and relations between the known decompositions. The lowest level of the decomposed functionalities is mapped into a set of components provided by vendors, and additional components on which the set of components depend are identified. Based on the set of components and the additional components, a required number of instances of service workload is calculated to generate the configuration requirements of the system that satisfy the user requirements.

20 Claims, 14 Drawing Sheets

(56) References Cited

U.S. PATENT DOCUMENTS

| | | | |
|---|---|---|---|
| 2005/0034107 A1* | 2/2005 | Kendall et al. | 717/136 |
| 2005/0160395 A1* | 7/2005 | Hughes | 717/102 |
| 2006/0248504 A1* | 11/2006 | Hughes | 717/101 |
| 2008/0216049 A1* | 9/2008 | Fournies et al. | 717/100 |
| 2008/0295068 A1* | 11/2008 | Kendall et al. | 717/104 |
| 2009/0077531 A1* | 3/2009 | Miloslavsky et al. | 717/100 |
| 2009/0125872 A1* | 5/2009 | Kannan et al. | 717/101 |
| 2009/0210390 A1* | 8/2009 | Lane | 707/3 |
| 2009/0249284 A1* | 10/2009 | Antosz et al. | 717/104 |
| 2010/0175054 A1* | 7/2010 | Matusikova et al. | 717/136 |
| 2010/0262558 A1* | 10/2010 | Edwards et al. | 717/100 |
| 2011/0029947 A1* | 2/2011 | Markovic | 717/102 |
| 2011/0088011 A1* | 4/2011 | Ouali | 717/105 |
| 2011/0231817 A1* | 9/2011 | Hadar et al. | 717/120 |
| 2011/0270595 A1* | 11/2011 | Salehi et al. | 703/6 |
| 2012/0159441 A1* | 6/2012 | Ghaisas | 717/123 |
| 2013/0091485 A1 | 4/2013 | Colombo et al. | |
| 2013/0138971 A1* | 5/2013 | Budko et al. | 713/189 |

OTHER PUBLICATIONS

Lawrence Chung et al, Requirements Elicitation Through Model-Driven Evaluation of Software Components, Fifth International Conference on Commercial-off-the-Shelf (COTS)-Based Software Systems, 2006, pp. 187-196.

Pietro Colombo et al, Bridging the gap between user requirements and configuration requirements, Seventeenth International Conference on Engineering of Complex Computer Systems: ICECC, 2012, pp. 13-22.

Krzysztof Czarnecki et al, Staged Configuration Using Feature Models, R.L. Nord (Ed.): SPLC, LNCS 3154, 2004, pp. 266-283.

Soodeh Farokhi et al, A Model Driven Framework to Compose Heterogeneous Services, 2011 International Conference on Information Science and Applications: ICISA, 2011, pp. 1-10.

Xavier Franch et al, Using Quality Models in Software Package Selection. IEEE Software: IEEE Computer Society, 2003, pp. 34-41.

Frédéric Jouault et al, Transforming Models With ATL*, J.-M. Brunel (Ed.): MoDELS 2005 Workshops, LNCS 3844, 2006, pp. 128-138.

Jinxin Lin et al, A Requirement Ontology for Engineering Design, Enterprise Integration Laboratory: Dept. of Industrial Engineering (University of Toronto), CE 96: Collaborative Work, Aug. 1, 1996, pp. 1-24.

Claus Pahl, Ontology-Based Composition and Transformation for Model-Driven Service Architecture, A. Rensink and J Warmer (Eds.): ECMDA-FA 2006, LNCS 4066, 2006, pp. 198-212.

Pejman Salehi et al, A Model Driven Approach for AMF Configuration Generation, F.A. Kraemer and P.Herrmann (Eds.): SAM 2010, LNCS 6593, 2011, pp. 124-143.

Service Availability Forum, Service Availability Forum Application Interface Specification, Availability Management Framework: SAI-AIS-AMF-B.04.01, Sep. 30, 2011, pp. 1-452.

Service Availability Forum, Service Availability Forum Application Interface Specification, Software Management Framework: SAI-AIS-SMF-A.01.02, Sep. 30, 2011, pp. 1-173.

Christian Bartsch et al, Decomposition of IT Service Processes and Alternative Service Identification Using Ontologies, IEEE, 2008, pp. 714-717.

Pietro Colombo et al., Bridging the gap between user requirements and configuration requirements, 2012 IEEE 17th International conference on engineering of complex computer systems, Jul. 18, 2012, pp. 13-22.

Jing Dong et al., Dynamic web service composition based on OWL-S, Science in China series F: Information Sciences 2006, vol. 49 No. 6, Dec. 1, 2006, p. 843-863.

A. Kanso et al., Generating AMF Configurations from Software Vendor Constraints and User Requirements, 2009 International Conference on Availability, Reliability and Security, 2009 IEEE, Mar. 16, 2009, pp. 454-461.

Pejman Salehi et al., A Model Driven Approach for AMF Configuration Generation, Oct. 4, 2010, System analysis and modeling: about models, Springer Berlin Heidelberg, pp. 124-143.

Minghui Wu et al., QoS and Situation Aware Ontology Framework for Dynamic Web Services Composition, 12th International conference on Computer supported cooperative work in design, IEEE, Apr. 16, 2008, pp. 488-493.

PCT Search Report from corresponding application PCT/IB2014/066056.

* cited by examiner

ONTOLOGY-BASED USER REQUIREMENT DECOMPOSITION FOR COMPONENT SELECTION FOR SERVICE PROVISION

CROSS-REFERENCE TO RELATED APPLICATIONS

This application claims the benefit of U.S. Provisional Application No. 61/904,614, filed Nov. 15, 2013, and is a continuation-in-part of the U.S. patent application Ser. No. 13/342,767, filed Jan. 3, 2012, which claims the benefit of U.S. Provisional Application No. 61/545,408, filed Oct. 10, 2011, all of which are hereby incorporated by reference.

TECHNICAL FIELD

Embodiments of the invention relate to the Availability Management Framework (AMF).

BACKGROUND

In order to provide highly available services that incur minimal to no outage, several leading telecommunications and computing companies have formed the Service Availability Forum (SA Forum). The SA Forum has defined standard middleware services including the Availability Management Framework (AMF) (see, *Service Availability Forum. Application Interface Specification, Availability Management Framework, SAI-AIS-AMF-B*.04.01) to enable the development of highly available systems and applications. This middleware service manages the components composing an application by shifting, for instance, the workload from a faulty component to its redundant components. The software/hardware components, their types, their relations, and the services that the application is composed of are given in a configuration file, referred to as the AMF configuration.

The AMF concept may also be used to manage availability for a system that is not highly available, or a system that is highly available with respect to only a portion of its services. For example, in a banking service system the bill viewing service may be available at 99% (which is not highly available), but the transfer service is available at 99.999% (which is highly available). A user may specify these availability requirements as part of user requirements among other user requirements for service provision. The user requirements are used to derive configuration requirements for generating the AMF configuration. Due to the complexity of the AMF domain, it is generally not recommended to create an AMF configuration manually.

SUMMARY

According to one embodiment, a computer-implemented method is provided for automatically generating configuration requirements from user requirements, wherein the configuration requirements specify provision of services using a system-level description. The method comprises the steps of: decomposing, by a computer system, the user requirements into one or more levels of decomposed functionalities using an ontology as input, wherein the ontology stores known decompositions of functionalities and relations between the known decompositions; mapping a lowest level of the decomposed functionalities into a set of components provided by vendors; identifying additional components on which the set of components depend; and calculating, based on the set of components and the additional components, a required number of instances of service workload to thereby generate the configuration requirements of the system that satisfy the user requirements.

According to another embodiment, a computer system is provided to automatically generate configuration requirements from user requirements, wherein the configuration requirements specify provision of services using a system-level description. The computer system comprises: a memory to store an ontology that further stores known decompositions of functionalities and relations between the known decompositions. The computer system further comprises one or more processors coupled to the memory. The one or more processors are adapted to: decompose the user requirements into one or more levels of decomposed functionalities using the ontology as input; map a lowest level of the decomposed functionalities into a set of components provided by vendors; identify additional components on which the set of components depend; and calculate, based on the set of components and the additional components, a required number of instances of service workload to thereby generate the configuration requirements of the system that satisfy the user requirements.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
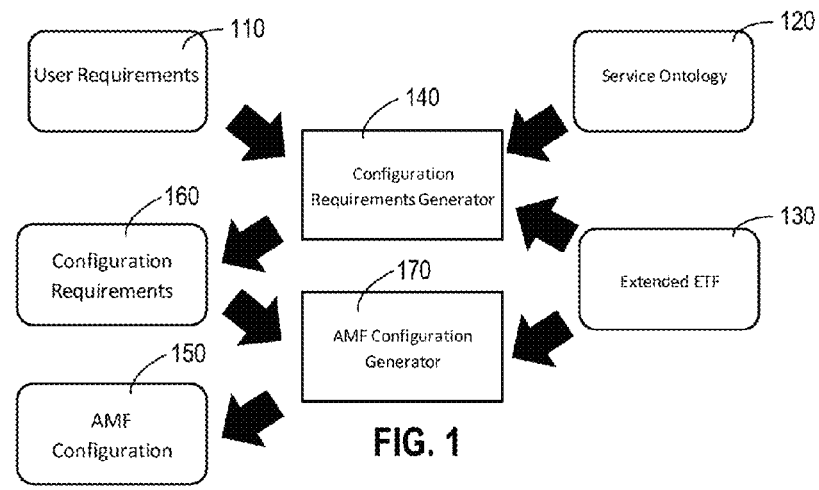
FIG. 1 illustrates an overview of generating AMF configurations from user requirements according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Systems based on commercially-off-the-shelf (COTS) components are built by integrating different components potentially provided by different vendors to meet user requirements. The gap may be quite large between the user requirements (related to the overall system) and the available components. Thus, the selection of appropriate components for building the system that satisfy the user requirements becomes a difficult task. An approach is described herein to close the gap between the user requirements and the component selection. The approach may be taken in the context of highly available systems to be deployed on a SA Forum compliant middleware, where the software and hardware components and the services they provide are logically separated to ensure the availability of the services through managing the components. However, the applicability of the approach is not limited to highly available systems. In one scenario, the approach may be taken in the context of cloud computing where service is delivered on demand based on service level agreements (SLAs) regardless of the reliability characteristics of the software and hardware components used to deliver these services. That is, in the context of cloud computing, the components are also logically separated from the service they provide. In another scenario, a user may benefit from having its user requirements decomposed by two different service providers. Based on the same user requirements, two different sets of configurations are generated (one from each service provider) and the related pricing can be provided to the user for comparison.

In one embodiment, user requirements are decomposed using ontology and transformed into configuration requirements. User requirements are a high-level description that describes user-perceived requirements for services; on the other hand, configuration requirements are a system-level description that describes how the system perceives those services at the granularity and the way the system perceives and manages those services. In one embodiment, the decompositions and transformations can be model-based, which include three meta-models and the transformations of the meta-models. Traceability links are added between the user requirements and the solution (e.g., the chosen COTS components) to facilitate system evolution and maintainability.

In the past, a model-driven approach was developed to start from a configuration requirements model (CR model) and automatically derive a valid AMF configuration (see, Salehi et al., *A model driven approach for AMF configuration generation*, in Proceedings of the 6th International Conference on System Analysis and Modeling, SAM'10, pages 124-143, 2010). However, the CR model is specific to the AMF domain and is typically far from the requirements that the user would express. Rather than specifying the requirements in terms of AMF concepts, the user is interested in the functionalities that the system will provide and its non-functional properties; that is, qualitative and/or quantitative characteristics of the corresponding functionalities such as performance and level of availability.

In the following description, an approach to automatically decompose user requirements into functionalities that can be directly mapped to COTS components is proposed. The decomposition is achieved via model transformations and uses an ontology that stores possible decompositions and relations between decomposed elements. In addition to the benefit of automating the decomposition, the described approach also makes it easier to consider alternative decompositions and to take into consideration optional COTS components. The described approach enables the creation of several alternative sets of COTS components that can be used to provide the desired service. The best solution can then be chosen by the customer or based on non-functional requirements. In one embodiment, the information about each COTS component (such as its version, the services it provides and depends on, and possible restrictions) is specified by the vendor in terms of prototypes in a file called the Entity Types File (ETF) provided along with the COTS component.

It is understood that the term "COTS component" herein is equivalent to the ETF component type (or its composition) in the SA Forum terminology. For example, a COTS component may be a software package that can be installed at many places and at each installation location many instances (i.e., AMF components) can be started. However, it is understood that a COTS component, as used herein, is not limited to the ETF component type (or its composition) that is commercially available. More specifically, a COTS component, as used herein, may include an ETF component type (or its composition) that is not commercially available but is available through other means. Thus, unless specifically indicated otherwise, the term "component" is used herein to represent available ETF component type (or its composition), whether through a commercial means or alternative means.

According to one embodiment, an ontology stores the decomposition of functionalities such that the functionalities at the lowest level, i.e., those that cannot be decomposed any further, can be mapped to the prototypes (e.g., service types and/or component service types) representing the functionalities of the COTS components. To provide flexibility and not be restricted to a particular set of COTS components or their prototypes, the mapping of functionalities to the COTS components' prototypes is optional in the ontology. For simplicity of the following description, it is understood that the term "COTS components" is used interchangeably with "prototypes of the COTS components," unless specially indicated otherwise. Thus, "mapping to a COTS component" is to be understood to mean "mapping to one or more prototypes representing a COTS component," and "selecting a COTS component" is to be understood to mean "selecting one or more prototypes of a COTS component." It is noted that a COTS component may include multiple prototypes; thus, when a COTS component is selected or chosen, any number of its prototypes may be chosen.

Automating the decomposition by using transformations also allows for automatically adding traceability links between the user requirements and the chosen prototypes of the COTS components. These traceability links map UR model elements to elements of the AMF configuration domain and therefore facilitate system evolution triggered by requirement changes such as performance improvements or other non-functional requirements perspective.

FIG. 1 illustrates an overview of the overall process for generating valid AMF configurations from user requirements according to one embodiment. The first portion of this description focuses on the upper part (110, 120, 130 and 140) of FIG. 1 where user requirements 110, a service ontology 120 (also referred to as "ontology") and an extended ETF model 130 serve as an input for a configuration requirements generator 140, which generates an output (i.e., the configuration requirements 160). Subsequently, the output 160 of the configuration requirements generator 140 and the extended ETF model 130 are used by an AMF configuration generator 170 to generate an AMF configuration 150. In one embodiment, the overall process of FIG. 1 can be performed by a computer system, which is to be described in more detail with reference to FIG. 17.

The following describes the ontologies for requirement decomposition according to one embodiment. Service providers often offer a limited set of predefined services that cannot be customized further according to the customer's needs as that would require the manual task of a service configurator. Consider for instance a provider that offers web services to its clients. One client may require a higher bandwidth, while another one wants the web service to be encrypted and a third prefers COTS components from a specific vendor. Typically, these services consist of several parts that have to collaborate to provide the desired functionality. Instead of having a service configurator going through the process of decomposing the web service until it can be mapped to COTS components for each customer separately; a number of alternative decompositions can be stored in a service ontology (also referred to as an ontology). Experience with service decomposition and component selection can then be reused.

The ontology represents the service knowledge and contains information on how different functionalities can be decomposed and/or composed and where interactions between them can provide more complex services. With the help of an ontology, requirement decomposition and component mapping can be automated. Additionally, alternative component sets can be generated so that compliance with non-functional requirements can be evaluated for different solutions. Optional functionalities that may not be requested by all customers can be easily included in an ontology.

In one embodiment, the COTS components that are available for providing the desired functionality are stored in a separate model, as they might change frequently. For instance, a new version of some software may be released every few months, or available hardware elements may change. By keeping the decomposition separate from the components, it is ensured that the ontology and thus the knowledge about functionality decomposition can be reused even when the COTS components that are available to provide different functionalities change. In addition, keeping the decomposition separate from the components makes it easier to use different sets of COTS components for different customers.

Figure 2:
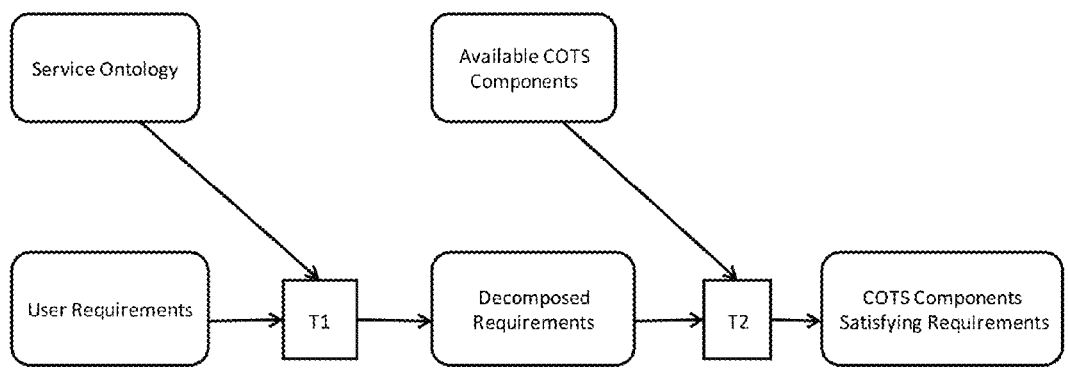
FIG. 2 illustrates a transformation process of decomposing user requirements using a service ontology according to one embodiment of the invention.

FIG. 2 illustrates a transformation process of decomposing user requirements using a service ontology according to one embodiment of the invention. After the decomposition, COTS components are selected. In one embodiment, UML models are used to describe all the artifacts in FIG. 2 and the Atlas Transformation Language (ATL) is used for the transformations.

The following describes the service ontology according to one embodiment. When a customer requests a service, this requirement can be looked up in the ontology and decomposed accordingly. The decomposition of this service is then followed until the service cannot be decomposed any further. The ontology is constructed such that the elements at the lowest (i.e., last) level of decomposition can be mapped to COTS components. The functionalities at the last level of decomposition are then compared to the functionalities that available COTS components can provide, and then from the possible alternatives a set of COTS components are chosen for each decomposed service. The result is a set of COTS components that together provide the desired composite service.

In the embodiments described herein, the ontology is used to automate the decomposition of user requirements. In some alternative embodiments, the customer itself may perform part of the decomposition. In case the customer has some service knowledge and wants to be more specific in the requirements, he may specify the decomposition of his requested service to any depth. In one embodiment, the ontology is only used to complete the decomposition requested by the user; for instance, if an element was omitted from the user-specified decomposition, or some elements are not decomposed to the level where they can be mapped to COTS components.

Figure 3:
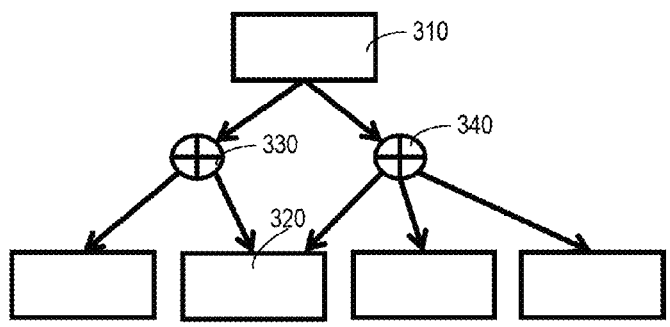
FIG. 3 illustrates decompositions with different number of elements according to alternative embodiments of the invention.

In the ontology, functionalities can have alternative decompositions, so that there may be alternative sets of COTS components that provide the same service. The ontology can provide alternative solutions. Different decompositions of the same functionality may consist of a different number of elements. This can happen either because some elements in a decomposition are not strictly necessary and are consequently left out in another decomposition, or because some functionalities can combine features of other functionalities. Some of the elements in alternative decompositions may overlap. An example is shown in FIG. 3, where the functionality at the top level 310 has two different decompositions (330 and 340) that have one element 320 in common. One of the decompositions consists of two and the other one of three elements.

The alternative decompositions allow a functionality to have optional elements that are not necessarily required to provide a service but can be desirable for some customers. In addition, it means that alternative sets of components can be created to satisfy the functional user requirements. As customers can have different priorities regarding non-functional requirements such as cost or performance, the most appropriate solution set can be chosen later for each customer individually. Moreover, it would be possible to determine what would be the range of the cost for a specific service for management purposes.

In one embodiment, the user requirements, the ontology and the available COTS components are modeled in UML, and ATL model transformations are used for the automated decomposition of user requirements according to the service ontology into COTS components. The following description explains, in more detail, the meta-models for the user requirements, the ontology and the COTS component catalog. The meta-model for the COTS component catalog is also called the extended ETF meta-model in the following description.

Figure 4:
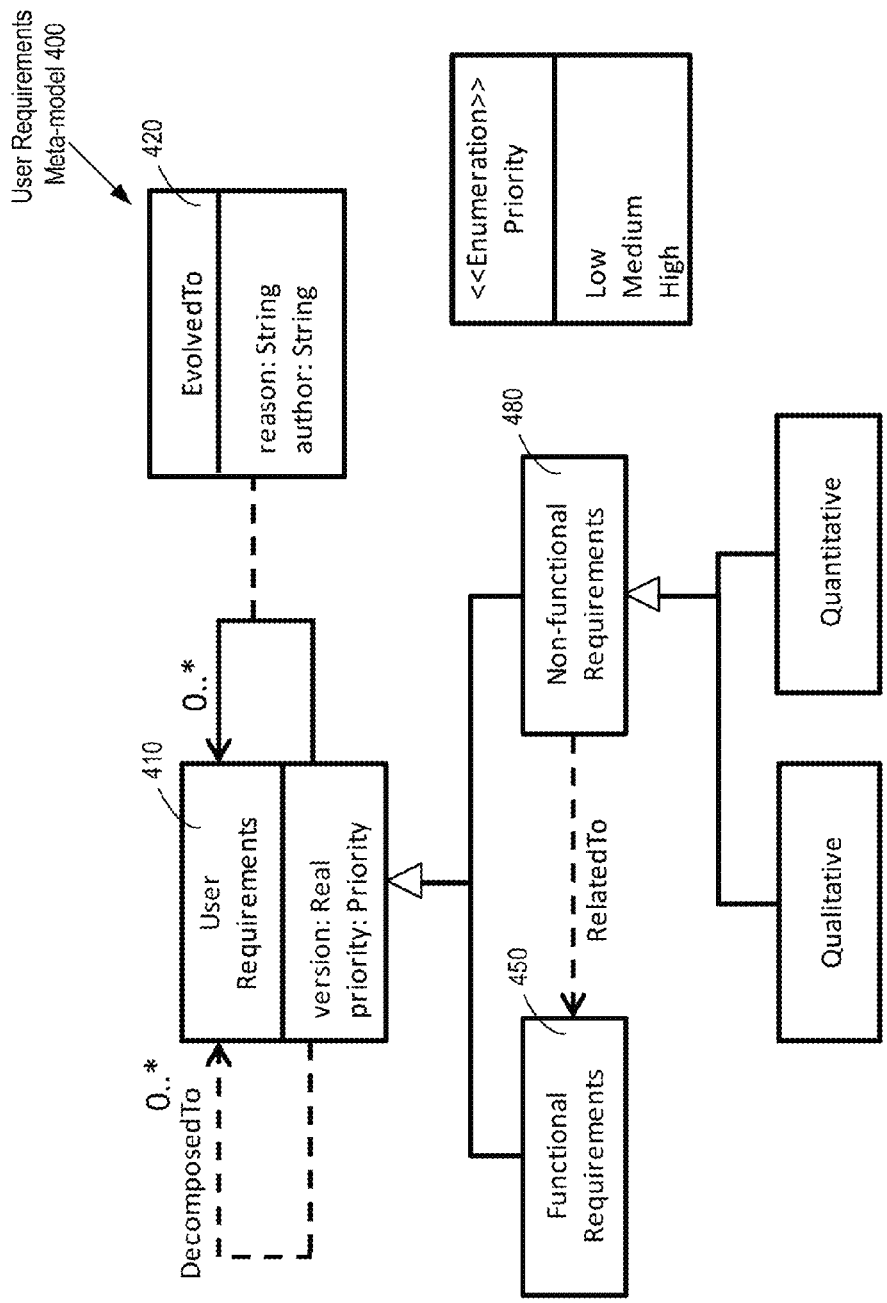
FIG. 4 illustrates a meta-model for user requirements according to one embodiment of the invention.

FIG. 4 illustrates an embodiment of a user requirements meta-model (UR meta-model) 400. User requirements 410 can be specified according to the UR meta-model 400 in terms of functional requirements 450 and non-functional requirements 480. The UR meta-model 400 distinguishes between functional and non-functional requirements. Non-functional requirements can be added to functional requirements at any level of the decomposition. In one embodiment, non-functional requirements apply not only to the functional requirement itself but also recursively to all elements in the decompositions of the requirement, unless explicitly specified otherwise. A functional or non-functional requirement may be further decomposed into functional or non-functional requirements.

In a user requirements model (UR model) based on the UR meta-model 400, the decomposition of functional and non-functional requirements is allowed as users may decompose the requested service to some extent. User requirements 410 are also versioned: a requirement may change from one version to another. This allows the user to modify the requirements, for example, to weaken a non-functional requirement, which may be necessary if with the current requirements no valid configuration can be found. For example, such a change can be marked as an "EvolveTo" relation 420. The attribute "author" shows who changed the requirement and "reason" indicates why the change is necessary.

Figure 5:
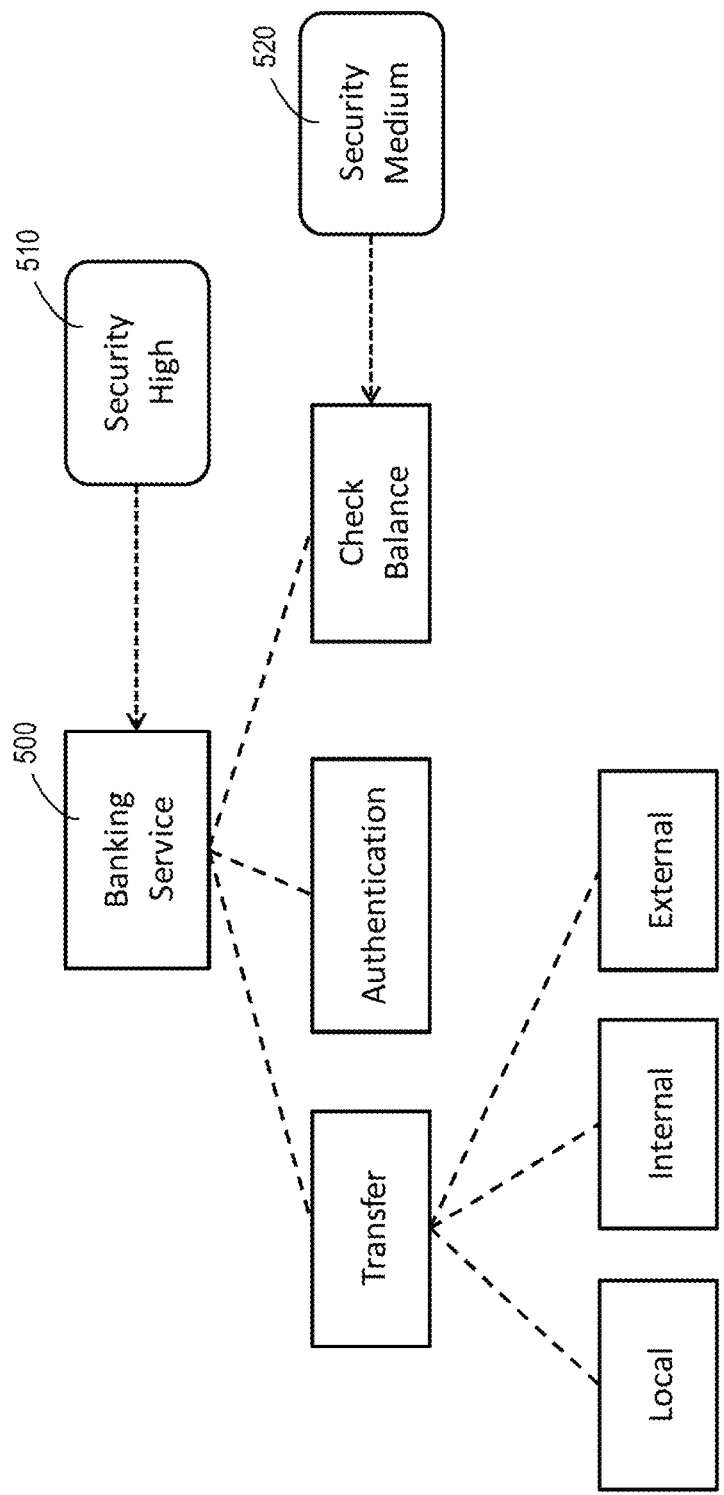
FIG. 5 illustrates an example of a user requirements model of a banking service according to one embodiment of the invention.

FIG. 5 illustrates an example for a UR model of a banking service according to one embodiment. The requested service is a banking service 500, and the user has already specified a number of elements for the decomposition. A non-functional requirement is specified for the overall banking service; namely, high security 510. In this example, for one of the composing requirements, it is also indicated that medium security 520 is accepted.

Before describing the decomposition in further detail, it is useful to describe the extended ETF meta-model. The COTS components to be managed by AMF are described in one or more ETFs in terms of entity prototypes. The basic entity prototypes are Component Types (also referred to as CTs or CompTypes) and Component Service Types (also referred to as CSTs or CSTypes). A CT represents the hardware or software version used as the implementation of AMF managed redundant components while the CSTs define the types of services such a component can provide. The CST is different from the service seen by a user. A service in user domain means the functionality that a component provides while a CST is the signature of assignment that AMF uses toward a component to control the provisioning of that functionality. The relationship between CTs and CSTs is also given in the ETF. This includes information on which CSTs that each CT can provide, and, in some scenarios, interactions between pairs of CSTs and CTs. Additional entity prototypes, such as service unit types, may be optionally used to specify how these basic elements are combined to achieve higher level functionalities, i.e. compositions of functionalities. According to one embodiment, ETF is extended to include, for each CST, the functionalities that the CST can provide and the non-functional properties of these provided functionalities.

Figure 6:
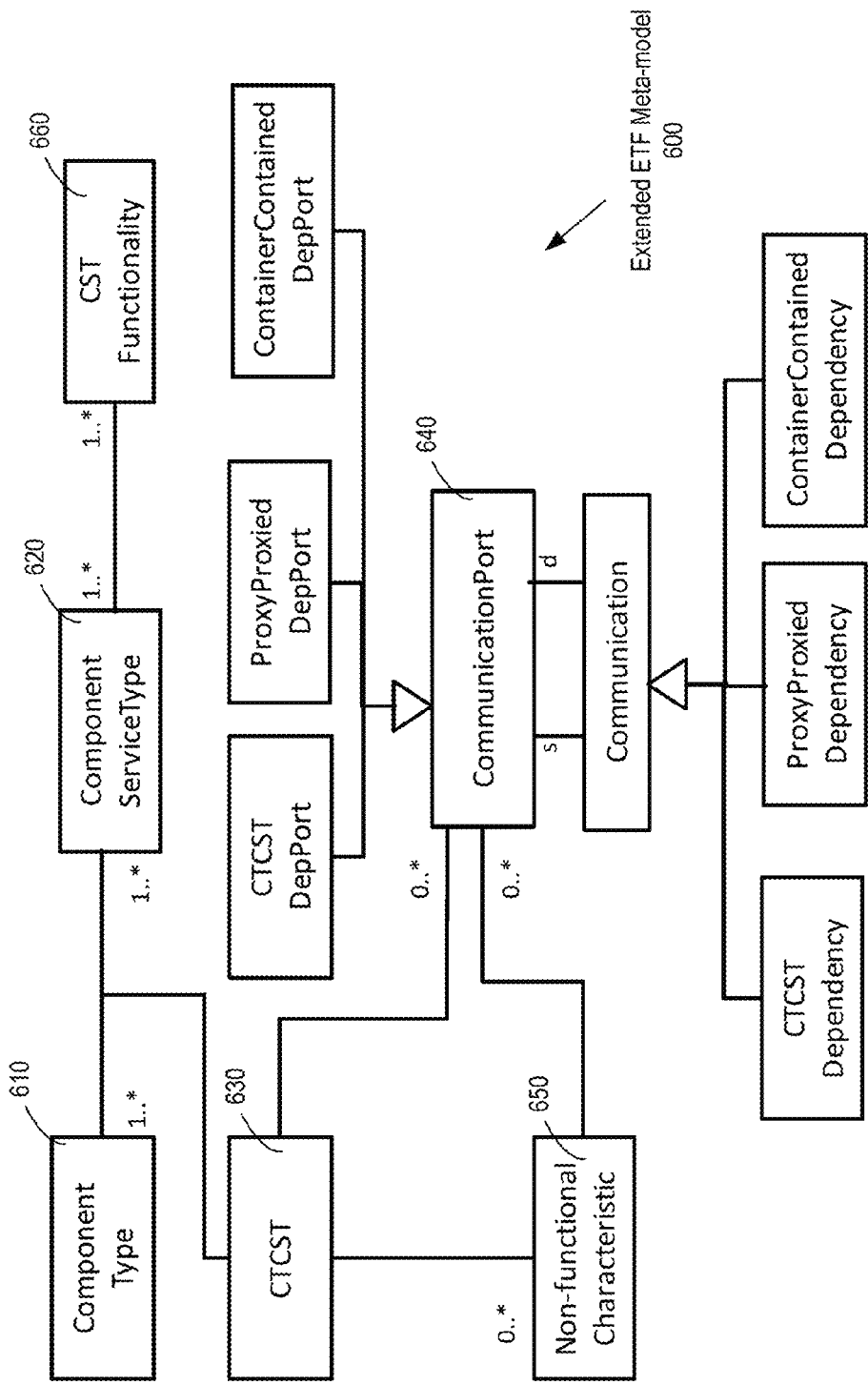
FIG. 6 illustrates part of a meta-model for an extended Entity Types File (ETF) according to one embodiment of the invention.

FIG. 6 illustrates a portion of an extended ETF meta-model 600 according to one embodiment. One CT 610 can provide several CSTs 620, and a CST 620 controlling a CTS functionality 660 can be provided by different CTs 610. Moreover, a CTS functionality 660 can be supported by different CSTs 610.

In one embodiment, the relationship between a CT 610 and a CST 620 is formalized by the CTCST elements 630 (also referred to as CtCSType). The Communicate and Communication Port elements 640 (also referred to as communication ports) are used to specify the interaction capabilities of a CT 610 when providing a CST 620. The interaction occurs when service provider entities in providing their services communicate among each other by exchanging data. In addition to data exchange, there can also be other dependencies (as specified in the AMF specification) between components. Both CTCSTs 630 and communication ports 640 can have non-functional characteristics 650, which can be used to guarantee the satisfaction of non-functional requirements in the user requirements. In one embodiment, a CT provides a CST with a specific non-functional characteristic 650.

The extended ETF meta-model 600 is built based on a standard ETF Extensible Markup Language (XML) schema. The extended ETF meta-model 600 includes two parts: a standard ETF and an ETF extension. Although not shown in FIG. 6, the standard ETF may also include information of entity prototypes such as Service Unit Type (SUType), Service Group Type (SGType), Service Type (SvcType) and Application Type (AppType), in addition to the CT 610 and the CST 620. The ETF extension extends the information in the standard ETF to describe the relationships between these service provider and service entity prototypes (e.g., the CTCST 630), the interaction among them (e.g., the communication ports 640 and the dependent ports/elements of the communication ports 640), and the non-functional characteristics 650. Examples of the non-functional characteristics 650 include, but are not limited to, performance measurements, interaction measurements, costs, level of availability, level of security, and other qualitative or quantitative characteristics; e.g., processing speed, throughput, data rates, latency, etc. Such non-functional characteristics 650 are part of the ETF extension and are not included in the standard ETF.

Figure 7:
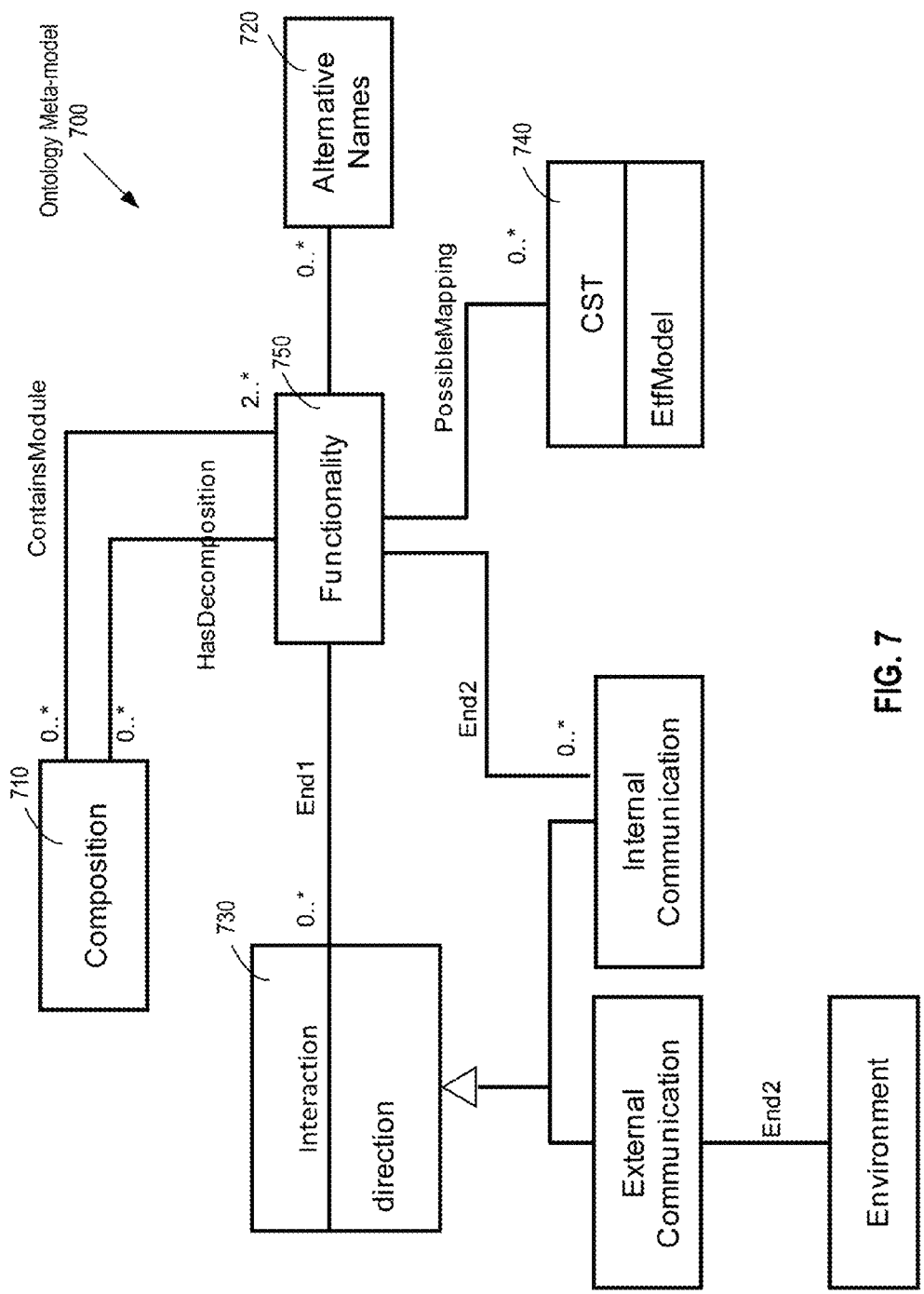
FIG. 7 illustrates a meta-model for a service ontology according to one embodiment of the invention.

FIG. 7 illustrates an ontology meta-model 700 according to one embodiment. The use of an ontology enables the abstraction of the functionalities of services from concrete software or hardware COTS components that provide these functionalities. This also means that the ontology can be reused even if for instance software versions or hardware providers change.

An ontology may contain functionalities 750 and compositions 710 of functionalities. Each composition 710 contains at least two functionalities while functionalities themselves may be compositions and decomposed into other functionalities. Functionalities can have several decompositions. Functionalities 750 in the ontology correspond to functional requirements in the user requirements model. Users may request the same functionality by different names (i.e., alternative names 720). For example, a user may request a database management system or a DBMS.

In one embodiment, an ontology may specify interactions between different functionalities or with the environment in which the system operates. In some embodiments, interaction elements 730 may be used to specify the interactions.

In one embodiment, an ontology may specify the mapping of a functionality to a service entity type 740, even if the mapping is already provided in the extended ETF model. This can be useful if, for a functionality, the mapping to a CST was added manually by a service configurator as there is no mapping for that functionality in the ETF model; for example, if the standard and not the extended ETF model was used by the vendor. It also helps software evolution when new versions of the software are provided by the vendor together with their respective ETF description.

When creating an ontology for a user-perceived service, the starting point is the ETF as it describes available COTS components in terms of the functionalities that they can provide at the smallest granularity as represented by CSTs and their valid combinations as service types. If the grouping of CSTs to service types is not specified in the ETF, that means that there is no restriction of their grouping and a service configurator may enrich the ontology manually by providing typical compositions and therefore increase the depth of the decomposition hierarchy. For example, a user may specify a decomposition to a required depth in his user requirements. After the decomposition is successfully mapped and transformed into the configuration requirements, the decomposition is fed back to the ontology, thus training the ontology to learn the decomposition.

Whenever a new COTS component becomes available, the ontology is updated with new functionalities. The ontology may also be updated for an existing functionality if there is a new alternative decomposition. Similarly, when a COTS component is no longer used and removed from the repository, or a specific functionality is not offered any more, the ontology is updated to remove the decompositions and the corresponding functionalities. Additionally, the ontology is also updated when the software of the existing components is updated, or when a user-specified composition of functionalities is successfully mapped to the available components in the extended ETF model and generates the configuration requirements.

Figure 8:
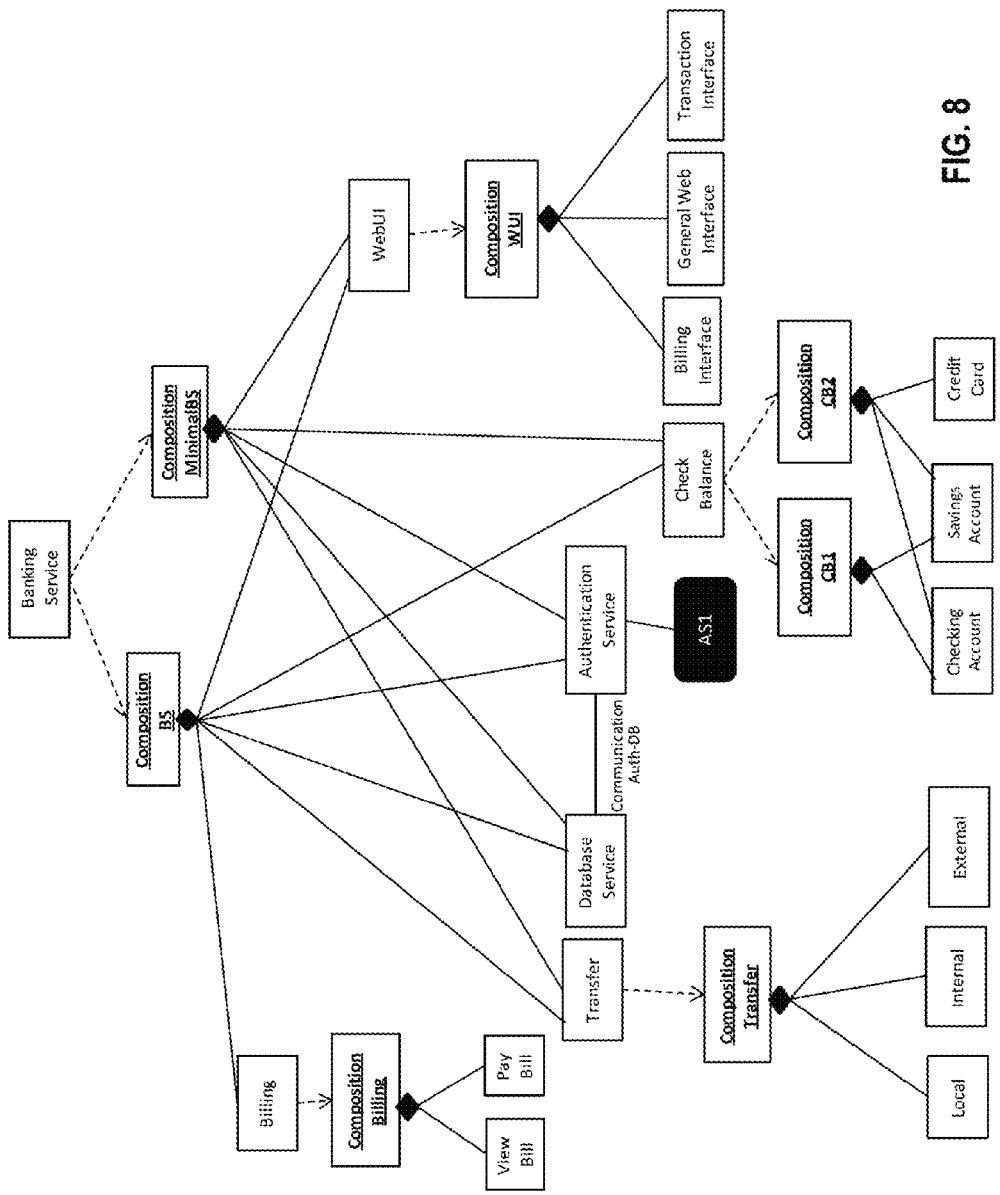
FIG. 8 illustrates an example of a banking service ontology according to one embodiment of the invention.

As an example, FIG. 8 illustrates an example of an ontology for a banking service according to one embodiment. Functionalities are represented by white rectangles and compositions are represented by white rectangles with underlined labels. In this example, decomposition is represented top down. There are two alternative decompositions: CompositionBS and CompositionMinimalBS with a number of common functionalities, and CompositioBS also includes the Billing element. A interaction element CommunicationAuthDB is also part of both compositions and exists between functionalities Authentication Service and Database Management. The common functionality Check Balance also has two alternative decompositions. In this example only the Authentication Service has a mapping to a CST, namely AS1 (represented by a dark rectangle with rounded corners).

The following describes the decomposition of user requirements via model transformation according to one embodiment. To decompose a given user requirement, model transformations is used instead of looking up the decomposition in the ontology and figuring out the alternative solutions manually. In addition to the advantage of automating the decomposition process, model transformation also makes it easy to keep track of the relations between the requested functionalities and the chosen COTS components and their prototypes. Therefore, the customer can see why each component was selected or rejected via traceability links. This information facilitates the system evolution and maintainability.

Figure 9:
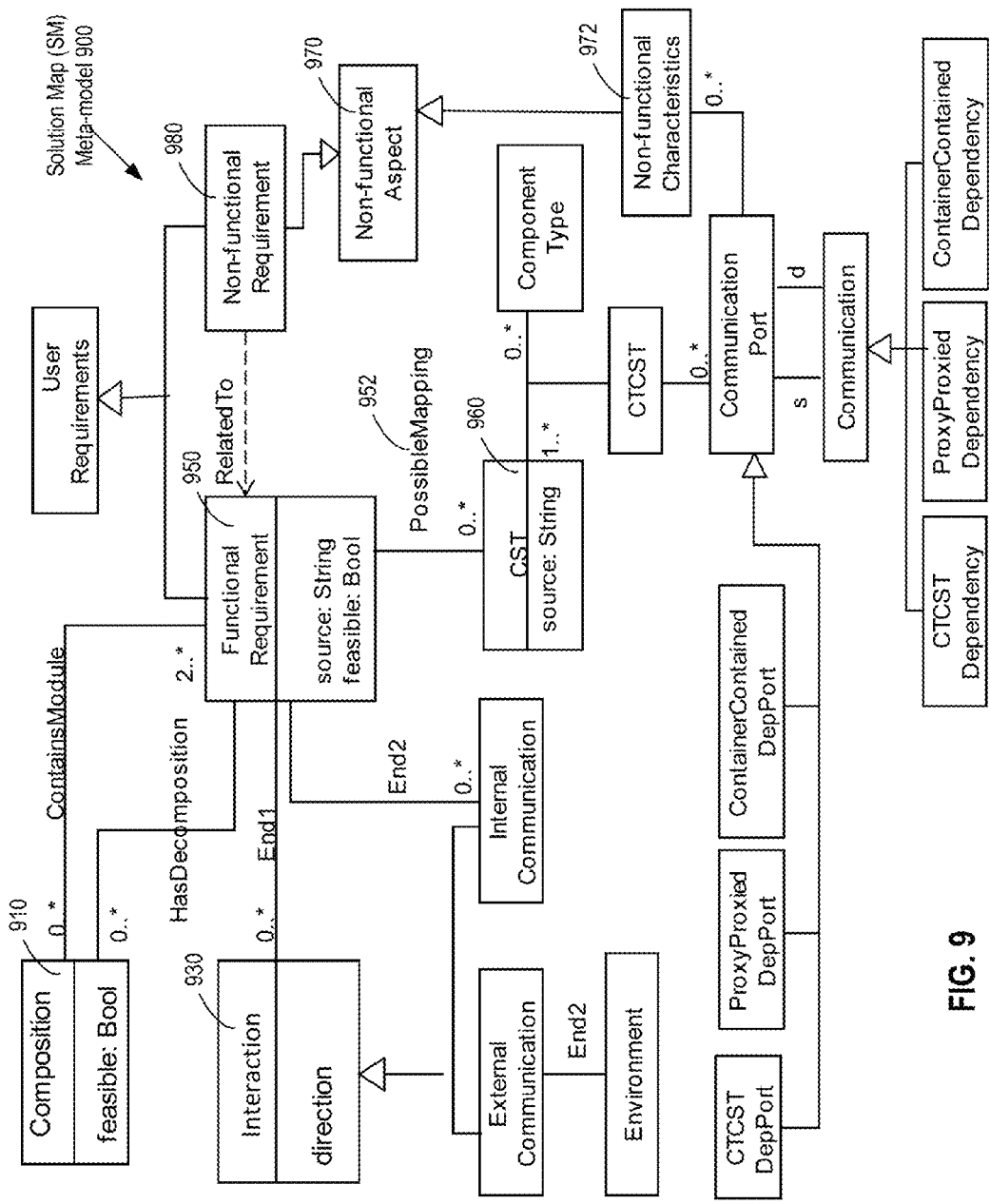
FIG. 9 illustrates a solution map (SM) meta-model combining information from user requirements, ontology and extended ETF according to one embodiment of the invention.

First, the concept of Solution Map (SM) meta-model is explained. According to one embodiment, model transformations combine the information of all three meta-models: user requirements, ontology and extended ETF into one meta-model—the SM meta-model. In this meta-model attributes are added to allow the tracing of where the different model elements originated from. An example of a composite SM meta-model 900 is shown in FIG. 9 according to one embodiment.

As there may be alternative decompositions of functional requirements, the composition element 710 from the ontology meta-model 700 can be used as the composition element 910 in the SM meta-model 900. The SM meta-model composition element 910 additionally has an attribute "feasible." The functional requirement 950 in the SM meta-model 900 is the same as the functionality 750 of the ontology 700 with which a match is performed. The functional requirement 950 also has additional attributes such as "source" and "feasible." When a functional requirement 950 matches the CST that a CT can provide, there is a potential mapping for the functionality which is represented by the Possible Mapping ("PossibleMapping") association 952. There may be more than one such mapping. The interaction 930 is used to specify the interactions between different functionalities or with the environment in which the system operates.

The non-functional characteristics 972 of a service (CST) provided by a CT and the non-functional requirements 980 requested by a user derive from the same concept, and they represent a non-functional aspect 970 (e.g., a qualitative and/or quantitative characteristic) of a functionality. For example, taking security as the non-functional aspect 970, the former represents that a CT can provide a CST at a specific level of security, while the later represents the level of security requested by a user.

In one embodiment of the SM meta-model 900, the functional requirements 950 and the CSTs 960 elements have an attribute "source" that indicates from which model they were added. A functional requirement may be specified in the user requirements model or it can be added through decompositions in the ontology. CSTs can either originate from the ontology or the extended ETF model. The "feasible" attribute of the functional requirements 950 and the compositions 910 indicates whether or not these elements can be provided with the given CSTs in the ETF model. These attributes are specific to the SM meta-model 900 and distinguish the SM meta-model 900 from other meta-models.

Figure 10:
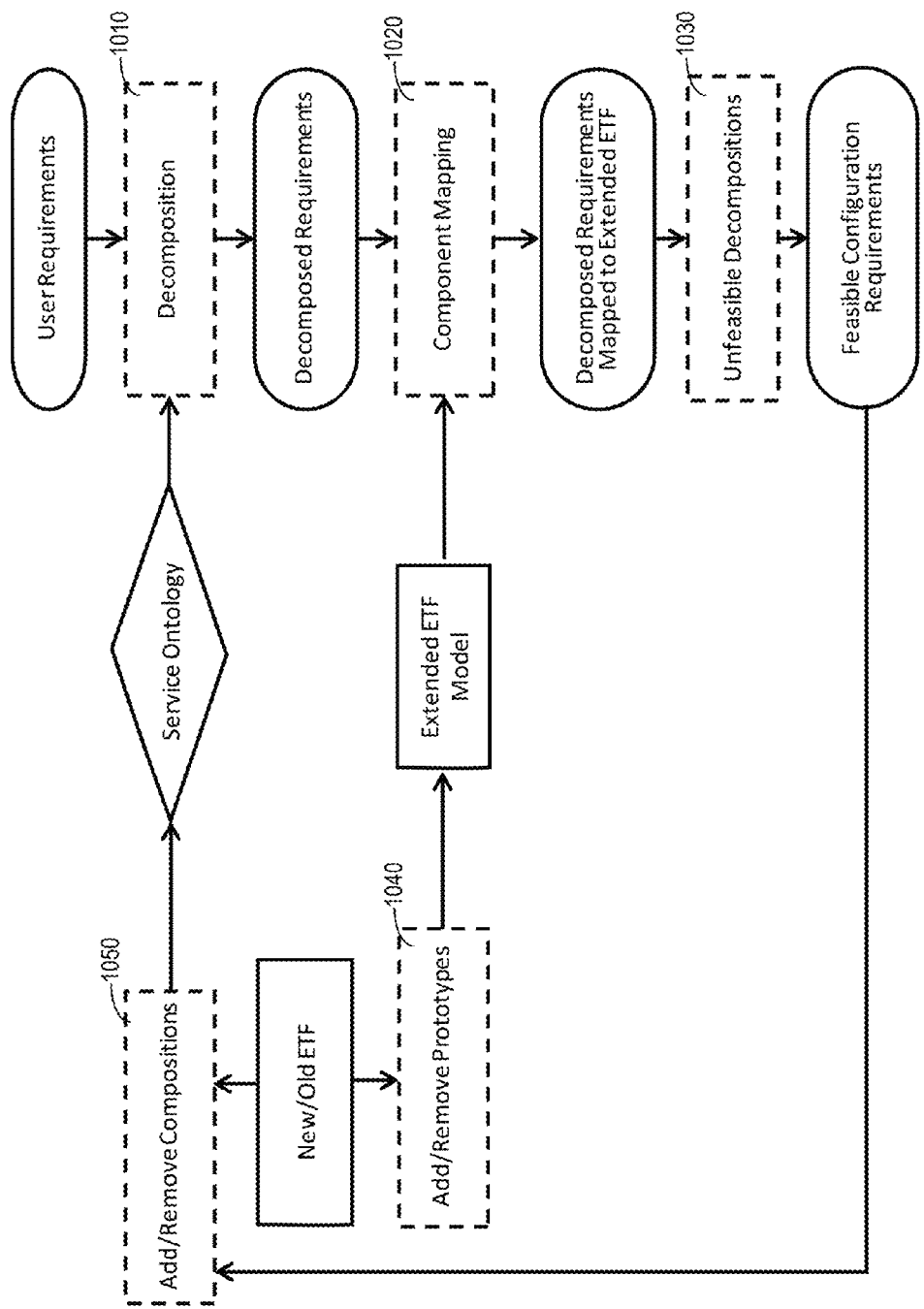
FIG. 10 illustrates model transformations for decomposing user requirements and mapping to ETF components according to one embodiment of the invention.

FIG. 10 illustrates a process of decomposing the user requirements into feasible configuration requirements according to one embodiment. In one embodiment, the process can be divided into three main model transformations (1010, 1020 and 1030). In one embodiment, ATL may be used to implement the transformations. In FIG. 10, the model transformations are shown with dashed rectangles. Additional transformations (1040 and 1050) are also defined to update the extended ETFs model and ontology by new and obsolete ETF files. These updates are performed first.

In FIG. 10, the transformation 1010 represents the decomposition of user requirements. The decomposition of user requirements can be performed in two steps. The first step transforms the UR model into a model equivalent to the SM meta-model. This means that the direct associations between functional requirements are replaced by composition elements and the "source" attribute of the functional requirements is set to "user requirement."

Considering the user requirements example of FIG. 5, where the Transfer and Banking Service elements depend on other functional requirements, this first step replaces these direct associations with the composition elements.

In the second step, which is the core of this transformation 1010, the functional user requirements are decomposed using the ontology as input. In some scenarios this can be performed to reach the level where all the functional requirements map to CSTs.

In the second step each functional requirement in the user requirements model—which is now conforming to the SM meta-model 900—is checked to determine whether a matching functionality exists and is a leaf functionality in the ontology. If this is not the case, e.g., there is a match in the ontology but it is not a leaf, then the subtree of the matching functionality is included from the ontology into the SM model under the functional requirement. This means that all decompositions of this matching functionality, including interaction elements and possible mappings to ETF types, are added to the SM model. This process is performed recursively, i.e., it is repeated for all functional requirements contained in decompositions of the first functional requirement as well as those that are required by the first functional requirement, etc.

Referring again to the example of FIG. 5, the leaf functional requirements are Local, Internal, External, Authentication and Check Balance. Transfer and Banking Service are not leaf functional requirements as they were decomposed already by the user into other elements.

For a functional requirement which matches a non-leaf functionality in the ontology, all the decompositions of the functionality in the ontology that contain at least the functionalities defined as functional requirements in the user requirements model are used, i.e., functionalities that are supersets of those requested in the UR model are added into the SM model. For instance, the decomposition of Banking Service in FIG. 5 contains Transfer, Authentication and Check Balance. These are all included in both decompositions of the Banking Service in the ontology shown in FIG. 8; therefore, both decompositions CompositionBS and CompositionMinimalBS are included in the SM model. However, if Billing was a functional requirement of the decomposition of Banking Service in the user requirements, CompositionMinimalBS could not be included in the SM model.

All functional requirements and CSTs that are added to the SM model in this step originate from the ontology; therefore, their "source" attribute is set to "ontology."

After combining the user requirements and ontology models, the information from the extended ETF model can be added to determine which available CTs through which CSTs are able to provide the functionalities. In this transformation 1020, the leaf functional requirement nodes of the SM model are of interest. For each of these nodes, it is checked whether any CST in the ETF model provide the needed functionality. If it is the case, then all such CSTs are added. They are added as Possible Mapping associations from the functionality to the CST. Next, for each CST all the CTs that may provide the CST are added to the SM model together with the appropriate CTCST associations. It is also checked whether any CT needs to interact with another CT to provide its CST. If so, the sponsor CT as well as its CST and their CTCST association together with the interaction ports and non-functional characteristics are added to the SM model.

Figure 11:
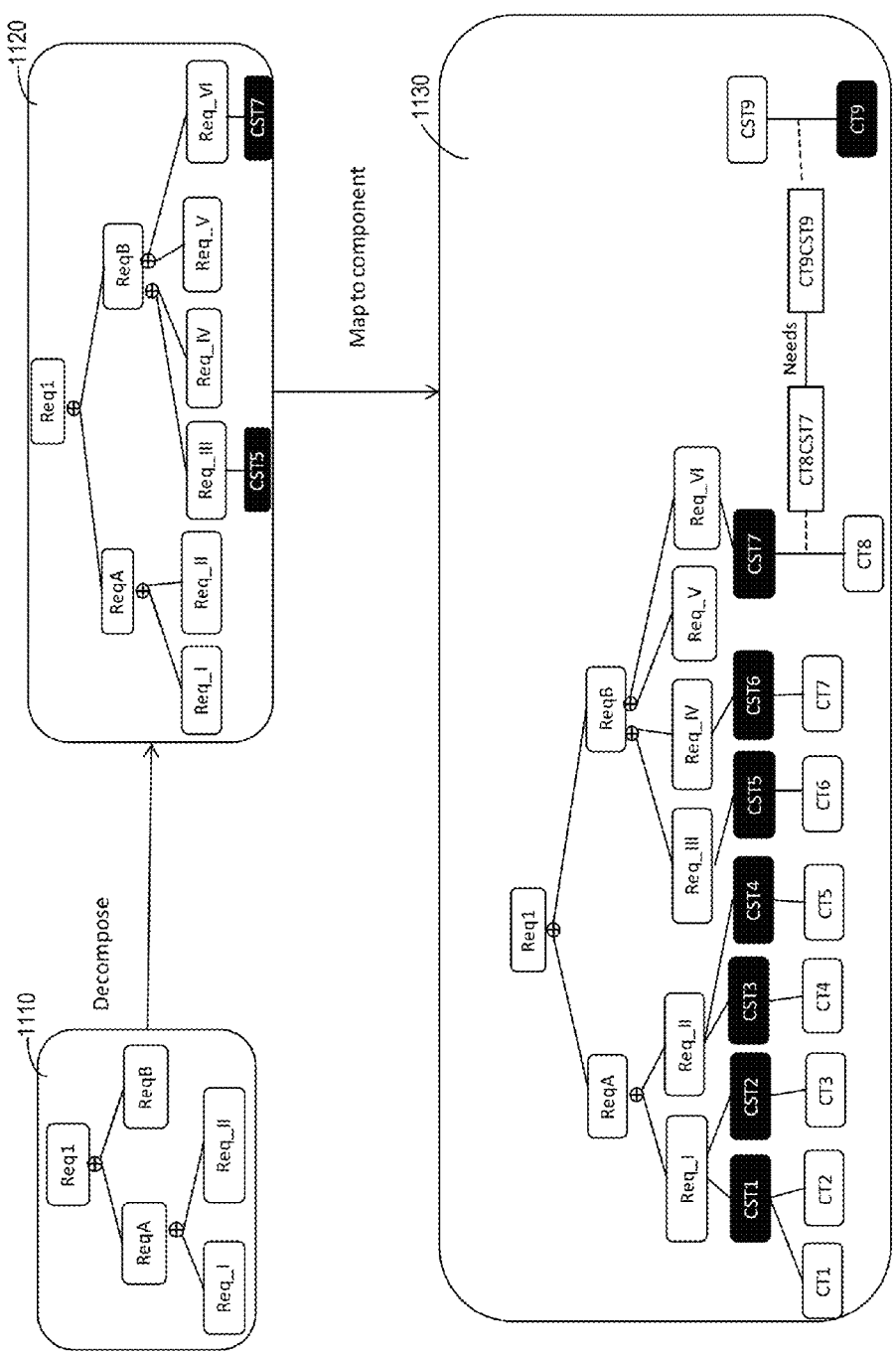
FIG. 11 illustrates mapping of decomposed functional user requirements to component service types and component types according to one embodiment of the invention.

FIG. 11 illustrates an example of the mapping of decomposed functional user requirements to CSTs and CTs using an ontology and an extended ETF model, according to one embodiment of the invention. A first block 1110 on the upper left shows a scenario in which a user requirement is partially decomposed by the user. In an alternative scenario, the user does not specify any decomposition in the user requirement.

To decompose a functional requirement of the user requirements, the ontology is used to find a matched decomposition. A match is found when a functionality in the ontology whose name (or alternative name) matches this requested functionality. If a match is found, the hierarchy of possible decompositions is added from the ontology to the SM model.

A second block 1120 shows that the decomposition is completed based on the ontology, and the leaf functional requirements are found. In the second box 1120 of FIG. 11, two of the decomposed functionalities Req_III and Req_VI are already mapped to CSTs, i.e., CST5 and CST7, respectively.

Next the extended ETF model is used to transform the leaf functional requirements to the ETF types and dependencies. In this step, the mapping of functional requirements to CSTs, CTs and other entity prototypes is performed. Some CTs may not be able to function on their own, that is, they may depend on the presence of other component types as indicated in the ETF model. These dependent component types are added to the SM model in order for the configuration to be valid and deployable.

In a third block 1130 which shows the SM model for this example, the leaf functional requirements are mapped to CSTs and the CTs providing the CSTs. These CTs and CSTs are extended with their dependencies. For example, in the third block of FIG. 11, functionality Req_VI is mapped to CST7. For component type CT8 to provide CST7, it needs CT9 to provide CST9, all of which are added to the SM model.

A functional requirement can be met by more than one component type providing the same or different CSTs. In FIG. 11, for functionality Req_I two matching CSTs are found: CST1 and CST2. CST1 can be provided by either of two component types CT1 or CT2. So there are three different component types that can be used to provide this functionality. In this scenario these three different component types are alternative solutions. These alternative solutions typically have different non-functional characteristics. The most appropriate solution can be chosen, which matches best the user requirements.

In a scenario where no match can be found in the extended ETF model, the decomposed functionalities that have no match are marked as unfeasible. Referring again to FIG. 10, the final transformation 1030 handles the leaf functional requirements that cannot be mapped to any CSTs or any supporting CTs of the extended ETF model. As there is no component type to provide the requested functionality, these functional requirements are not satisfied and cannot be used. Neither can the compositions that they are part of be used. To ensure traceability, these functionalities and compositions are marked as being unfeasible rather than getting deleted. The process is recursive. First, all leaf functional requirements and CSTs without a mapping are marked; then all compositions that contain unfeasible functionalities are marked. Functionalities that are not at the leaf level are marked as unfeasible if and only if all of their decompositions are unfeasible.

In the example of FIG. 11, staring from the leaves, if for a functionality (e.g., Req_V) of 1130, there is no mapping in the extended ETF model, that functionality with its parent function-compositions (e.g., Req_VI) is removed recursively. In the example, Req_III and Req_IV (which are the first alternative decomposition of Req_B) remain as the feasible decomposition of Req_B.

In one embodiment, if the user wants to combine some functionalities in a new way and provides a new decomposition in the user requirements, this new composition/decomposition may be added to the ontology if the composition of functionalities is successfully mapped to the available components in the extended ETF model and generates the configuration requirements. Thus, the user-specified composition can be fed back to the ontology via the transformation 1010 of FIG. 1 to enrich the ontology by the successful decompositions originating from the user.

Figure 12:
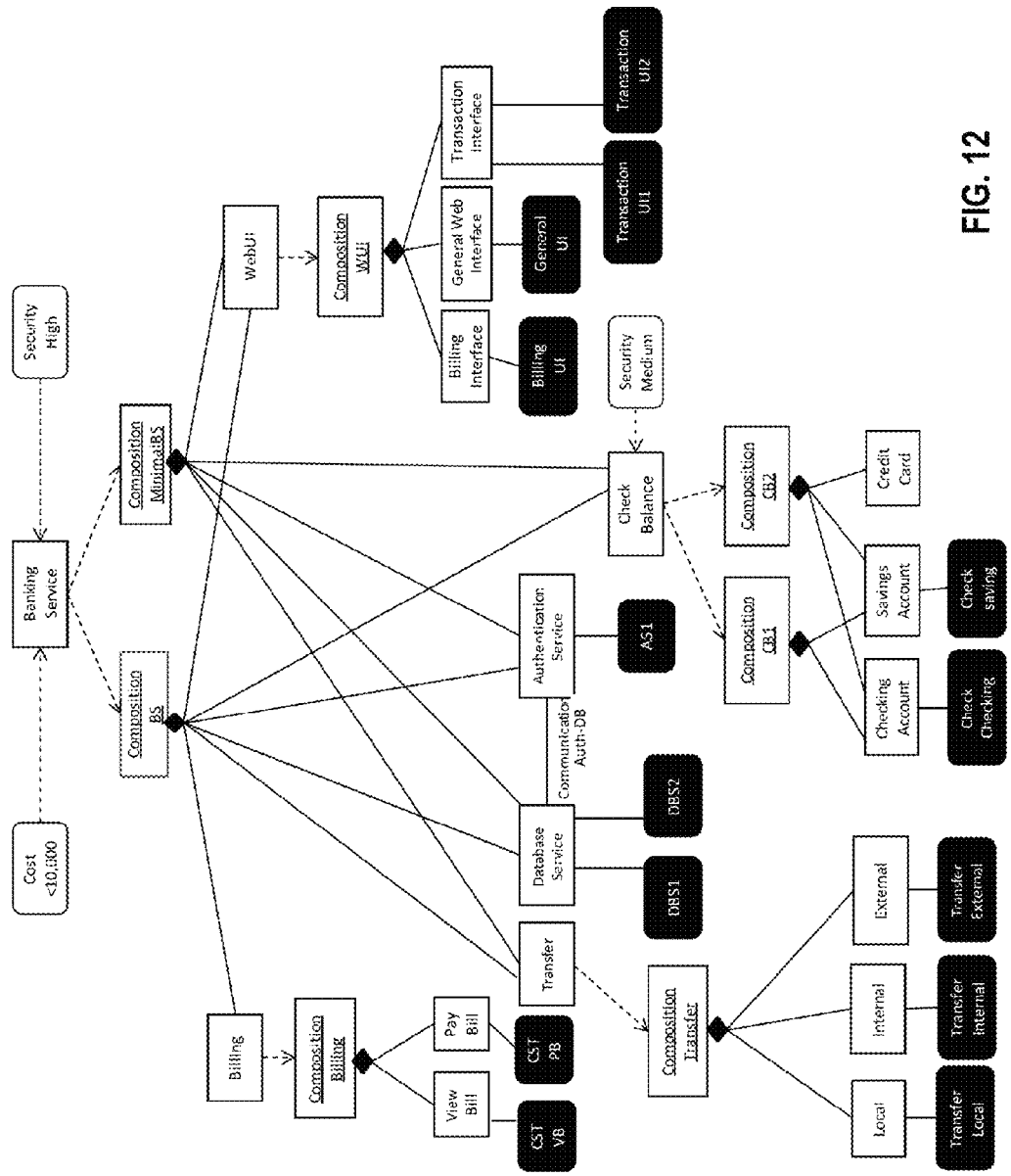
FIG. 12 illustrates a SM model for banking service user requirements according to one embodiment of the invention.

The result of the transformations for the banking service user requirements model of FIG. 5 is shown in FIG. 12, according to one embodiment of the invention. For simplicity, CTs that provide the CSTs mapping to the functional requirements are not shown in FIG. 12. In the banking service example of FIG. 12, only two elements are to be marked as unfeasible. The first one is the Credit Card functionality, as it does not have any mapping to a CST. As a consequence, the composition CompositionCB2 is also to be marked as unfeasible. The parent of this composition, Check Balance, however, is not to be marked as unfeasible, as it has an alternative decomposition, CompositionCB1, which is feasible.

Once the feasible decompositions are identified, they can be used to enrich the ontology. Namely, the composition elements that have their source as the user requirements are checked whether they are part of the ontology. If not they are added as new compositions. This is a transformation similar to adding compositions based on a new ETF file.

The above-described method enables automation of the service decomposition process based on the description of the available software and/or hardware components and an ontology that collects pre-defined and previously identified decompositions. Automation of service decomposition from user requirements to configuration requirements enables cloud users to manage their services themselves. The above-described method also adds traceability links so that the component selections can be analyzed and the requirements appropriately modified if no solution could be found. The traceability links indicate the reason why each component is rejected. The same links help to evaluate the needed system evolution when requirements change. By providing traceability information from the user requirements to the configuration requirements, it is easier for the user to understand why certain design decisions are taken.

In the above description, an approach for decomposing user requirements to the level where they can be mapped to component types is presented. The automated requirements decomposition presented herein simplifies the process of generating AMF configurations and makes it more user-friendly. The service knowledge about the decomposition of different functionalities is specified in an ontology, and the functionalities provided by the available component types are described in a separate model. In one embodiment, model transformations can be used to implement the whole process. Alternative transformation mechanisms may also be used.

In the following, a ten-phase process is described for generating configuration requirements from user requirements. In one embodiment, each of the ten phases is performed automatically by a computer system using the information stored in an ontology and an extended ETF model, as described above with reference to FIGS. 1-12, Phase 1: User Requirements Specification and Decomposition.

In One Scenario, the customer is interested in deploying a Highly Available (HA) web application that can handle 1000 requests per second. This scenario is to be used as the running example in the following description of the ten-phase process. In this example, the user requirements are too generic to be used for component selection. Thus, the user requirements are refined and decomposed into more detailed descriptions.

In one embodiment, the functionalities specified by the user requirements are automatically decomposed into a set of basic functionalities called "service module requirements" (also referred to as modules). In one embodiment, these basic functionalities are directly or indirectly related to the non-functional (NF) characteristics specified by the user requirements. In one embodiment, modules are modeled by the class Module (which is the same as the functional requirement 950 of the SM meta-model 900 of FIG. 9) the instances of which are identified during this decomposition. The class includes attributes that keep track of the module's name, role and functionality. In the running example of FIG. 13, the original user requirements named Web Application is decomposed into three different modules called HTTP Server, Interpreter, and DBMS. In one embodiment, the user requirements decomposition is made using an ontology. In an alternative embodiment, user requirements can directly map to entity prototypes defined in the extended ETF model without first being decomposed into service modules.

The functionality of a module can be either directly invoked by a user or though the interaction with other modules. At least one module has to communicate with the user. With respect to this interface, the modules that receive data are the input modules, and those that generate data are the output modules. In the example, HTTPServer is an input/output module, as it plays both roles.

In one embodiment, the class ModuleInterface (which is the same as the interaction 930 of the SM meta-model 900 of FIG. 9) models the module interface. The attributes of ModuleInterface specify the type and the role of the interface, i.e., if the interface is used to interact with the user or with other modules, and the direction of the flow of data that are exchanged during the interaction. For instance, in the running example, the interface ExtHttpServer models the interaction point of the HttpServer with the user, and the FromToInterpreter represents the interface with the module Interpreter (see Layer (1) of FIG. 13).

Figure 13:
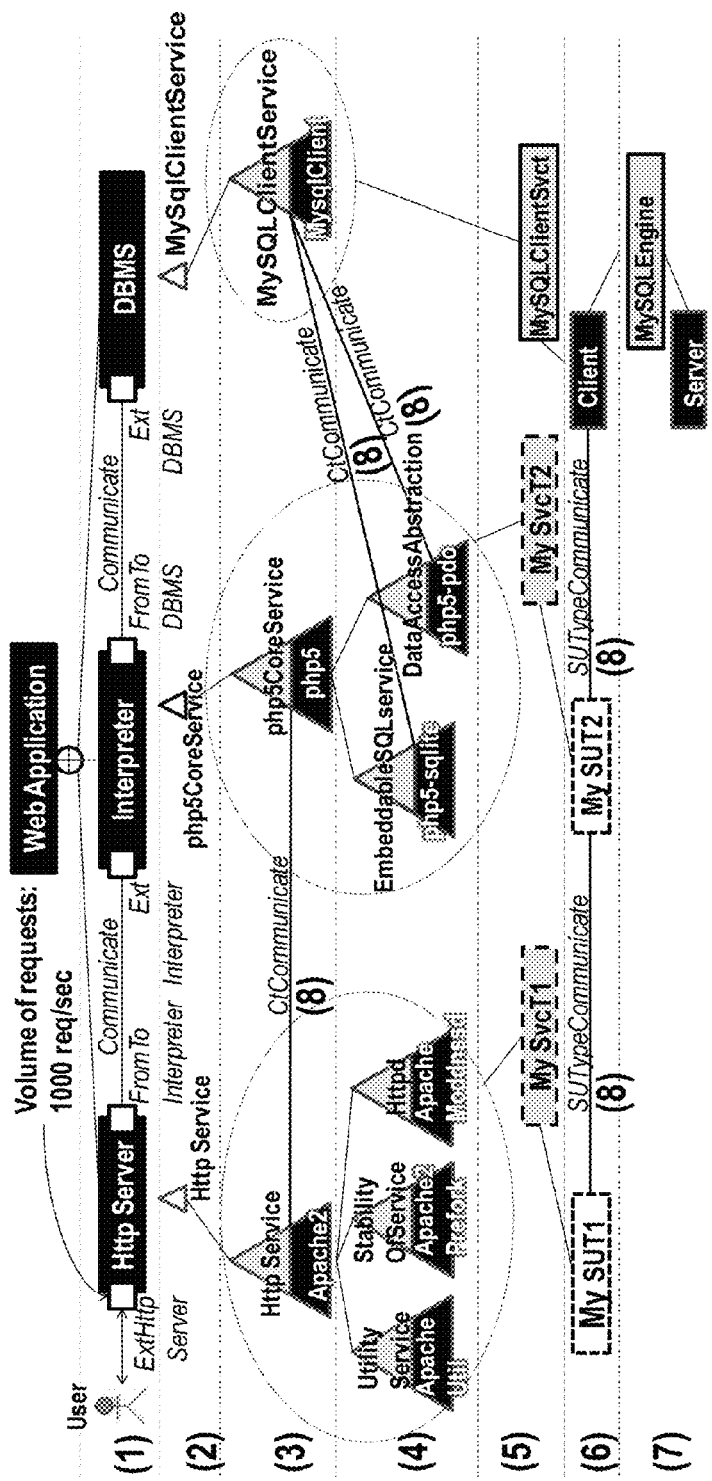
FIG. 13 illustrates an example of a process (Phase 1 to Phase 8) for generating configuration requirements according to one embodiment of the invention.

In one embodiment, the association Communicate supports this need by linking the interfaces of the modules involved in an interaction. As shown in FIG. 13, in the running example the HTTP Server and the Interpreter modules interact through the interfaces FromToInterpreter and ExtInterpreter, while the Interpreter and the DBMS, through the FromToDBMS and ExtDBMS, respectively. The first association models the requests to interpret PHP scripts and the provided responses that are exchanged through the interfaces of the modules. The second association models the operations requests on the DB and the provided answers.

In one embodiment, the non-functional properties specified informally in the user requirements are mapped to the modules at the user interface. More specifically, the mapping is made at the level of the user interfaces of the interested modules. In the running example, the expected volume of requests specified by the customer becomes a requirement for HTTP Server. The requirement is mapped to the interface ExtHttpServer and it is specified as a data flow associated with the interface using the DataRate class.

Phase 2: Identification of the Service Entity Prototypes Capable of Supporting the Functionalities Specified by the Service Module Requirement.

In this phase, the service entity prototypes of the extended ETF model are identified that are capable of supporting the module functionalities.

More specifically, a set of alternative ETF service entity prototypes are identified for each module obtained from Phase 1. This is done at the lowest level of granularity of the extended ETF model, namely the CSTypes. Such a selection is automated by further extending the extended ETF meta-model to provide not only the non-functional characteristics but also the description of the functionalities supported by the service entity prototypes.

Layer (2) of FIG. 13 shows the identified CSTypes represented by empty triangles. For instance, for the module Interpreter, the selected CSType is php5CoreService. Note that a module may map into multiple alternative CSTypes.

Phase 3: Identification of the Service Provider Prototypes Capable of Providing the Services.

The service entity prototypes identified in Phase 2 can be provided by different service provider entity prototypes.

In this phase, the CompTypes capable of providing the CSTypes identified for each module are selected. The selection is automatic through the exhaustive search in the extended ETF model. The selection can result in a set of alternative CompTypes for each CSType potentially indicating different non-functional characteristics. In the next phases, this preliminary selection is refined considering only those types that can satisfy the non-functional requirements of the module.

In Layer (3) of FIG. 13, each identified CSType is provided by different CompTypes. The gray part of the triangle represents the CSType (matching the empty triangle of Layer (2)), while the black part shows the CompType. For instance, CompType MysqlClient can be selected to support MySQL-ClientService and Apache2 to support HttpService.

Phase 4: Dependency Analysis at CompType Level.

The components and CSIs derived from the prototypes selected in Phase 2 and 3 alone may not be capable of supporting the functionality of each module. In this case, elements of other entity prototypes are added. The goal of this phase is the identification of these entity prototypes. The identification is achieved by means of the analysis of the dependency relationships of CompTypes.

Components can be from the Proxied category, thus requiring a Proxy that conveys the requests of the AMF. They can also be of the Contained category, requiring a Container capable of managing their life cycles. Moreover, based on CompType/CSType dependency, a CompType can depend on another CompType when providing specific CSTypes.

The selection of the additional entity prototypes resulting from the different types of dependency relationships is achieved through the automatic analysis of the extended ETF model. More specifically, for each couple of CompTypes/CSTypes identified in previous phases, it is determined if: (A) the CompType is Proxied or Contained. In this case the required Proxy or Container CompType and respectively the ProxyCSType or ContainerCSType that controls the Proxied or Contained component are selected; and (B) it is connected with another CompType/CSType, referred to as sponsor, through a CtCSType dependency. In this case, the sponsor entity prototypes are selected. The above determination ((A) and (B)) is applied recursively to all the selected and added elements.

Layer (4) of FIG. 13 shows a result of the dependency analysis. The selected elements, represented as grey and black triangles, are connected through links that model the dependency relationships. For instance, the pair php5CoreService/php5 depends on embeddableSQLservice/php5-sqlite and DataAccessAbstraction/php5-pdo, while the pair MySQLClientService/Mysqlclient does not depend on other elements.

Phase 5: Identification of the Service Types.

The pairs of CompType/CSType identified in Phase 3 are at the head of the graphs composed of a set of interdependent CompTypes/CSTypes. The CSTypes contained in these structures must be grouped into SvcTypes. The goals of this phase are: 1) the identification of the required characteristics of SvcTypes starting from the CSTypes' grouping criteria, 2) the analysis of the extended ETF model searching these SvcTypes, and 3) the creation of the required SvcType, if no applicable type is defined in the extended ETF model.

The aggregation criteria consider the type of dependency relationships and the constraints related to the service provider entities capable of providing the services. For example, all the CompTypes connected through a CtCSType dependency must be aggregated into the same SUType and the CSTypes into the same SvcType. Thus, a unique SvcType is required to group the CSTypes identified for the HTTP Server module. In fact all the pairs of CompTypes/CSTypes selected for this module are connected through CtCSType dependencies. The aggregation criteria also indicate when separate grouping is required.

Once the grouping conditions for the different groups of CSTypes are identified, it is necessary to examine the extended ETF model in order to find the SvcTypes that satisfy these requirements. In the case where at least one SvcType is defined in the extended ETF, this/these SvcType(s) will be selected. Otherwise, a new SvcType will be defined in order to satisfy the grouping requirements.

In the extended ETF model used in this example, SvcType MySqlClientSvct aggregates one CSType, called MySqlClientService, which was selected for the DBMS module. Therefore, MySqlClientSvct is the proper ScvType for this module. Since no SvcType in the extended ETF model groups the CSTypes selected for the HTTP Server and the Interpreter modules, two SvcTypes have been defined. MySvcT1 has been generated to aggregate HttpService, UtilityService, StabilityService, and Httpd CSTypes. MySvcT2 has been defined to group phpCoreService, embeddableSQLservice and DataAccess Abstraction.

Layer (5) of FIG. 13 shows the selected SvcTypes. The generated types are represented as dashed gray rectangles, while the types identified in the extended ETF model, as solid gray rectangles.

Phase 6: Identification of the SU Types.

Similar to Phase 3, this phase aims at selecting the service provider entity prototypes capable of supporting the selected service entity prototypes. However, the focus here is on the SUTypes capable of providing the SvcTypes identified in Phase 5.

First, for each SvcType it is necessary to determine whether the extended ETF model contains an SUType capable of providing it. This SUType should aggregate all the CompTypes whose CSTypes were considered for the selection of the SvcType. For instance, considering the DBMS service module in the running example, the analysis aims at identifying an SUType which provides MySqlClientSvct and contains MySqlClientComp. In this example, the Client SUType satisfies both requirements, and therefore is selected.

It is worth noting that one or multiple SUTypes can be identified for each SvcType. All the resulting type(s) must be selected. Each alternative SUType may be used to generate a different set of configuration requirements.

In the case where the considered SvcType is created, there will not be a proper SUType in the extended ETF model. Consequently, it will be necessary to define one. In the above example, the MySvcT1 and MySvcT2 SvcTypes have been created and MySUT1 and MySUT2 have been therefore defined to support them accordingly.

Layer (6) of FIG. 13 shows the selected SUTypes. The Client SUType contained in the extended ETF model is represented using solid black rectangles, while the created SUTypes are illustrated with empty dashed rectangles.

Phase 7: Dependency Analysis at the SUType Level.

The extended ETF model specifies whether a given SUType requires another SvcType for providing a certain SvcType. Based on the dependency the SUs of the involved SUTypes are capable of interacting with each other, meaning that some of the aggregated components of the SUs can interact with each other.

This dependency requires the interfaces of the involved SUTypes/SvcTypes to be compatible. For instance, let us suppose that SUType SUT-A depends on SUT-B/SvcT-B for providing the SvcT-A SvcType. The dependency requires the grouped pairs of CompTypes/CSTypes to be capable of interacting. This occurs when 1) the type of the data issued by the sender CompType/CSType, is compatible with the type of the data required by the receiver pair, and 2) the flow of data generated by the sender can be handled by the receiver (e.g., if throughput and/or data rate are compatible).

It is worth mentioning that CtCSType dependency is not considered here since this relationship is defined exclusively within the components of the same SU and not among the components of different SUs.

In the case of dependency, the interface of at least one pair of CompType/CSType grouped by the dependent SUType, SUT-A, should be compatible with at least one CompType/CSType of the supplier SUType, SUT-B. The interface of the SUType/SvcType aggregates the interfaces of the contained compatible CompTypes/CSTypes.

The analysis of SI dependencies may lead to the definition of chains of dependent elements. Each SUType, when providing a SvcType, may require one (or even multiple) SvcType(s) to be provided. Moreover, the SvcType at the end of each dependency relation may be provided by different SUTypes. These elements can also be affected by additional dependencies, recursively.

The analysis is applied to all the SUTypes identified in Phase 6 and recursively applied to the identified dependent SUTypes until identifying the entity prototypes that do not require other SvcTypes in order to support their SvcTypes. In the running example, the SUType Client requires MySQLEngine in order to provide MySQLClientSvct. The SUType Server is capable of providing MySQLEngine and Server is, therefore, selected. Since the SUTypes were generated, no dependency is defined for the SUTypes of the HTTP Server and Interpreter modules.

The result of the analysis for the running example is shown in Layer (7) of FIG. 13. Dependencies are represented using lines that connect the selected service and service provider entity prototypes.

Phase 8: Identification of Interaction Scenarios Between Service Provider Entity Prototypes Belonging to Different Modules.

In this phase the selected entity prototypes are refined based on the communication relationships defined among the modules of Phase 1. These relationships require the service provider entity prototypes selected for one module to interact with the entity prototypes of the associated one.

The interaction capabilities of the entity prototypes guide the selection of the proper elements to be used for each module. The analysis considers one relationship at a time. For instance, consider the scenario shown in the example of FIG. 14 where user requirements have been decomposed into two modules, called M1 and M2. M1 is interfaced with the user and requires communicating with M2. The entity prototypes selected for the modules are organized into alternative sets.

The analysis considers any possible combination of sets of the two modules. The process starts focusing on the first set of the entity prototypes of M1 and M2, namely, the collections denoted M1S1 M2S1. Different evaluation criteria are applied for 1) the case where all the entity prototypes in the sets exist in the extended ETF model and 2) the case where at least one of selected prototypes has been generated in phases 5 and 6 of the approach.

Figure 14:
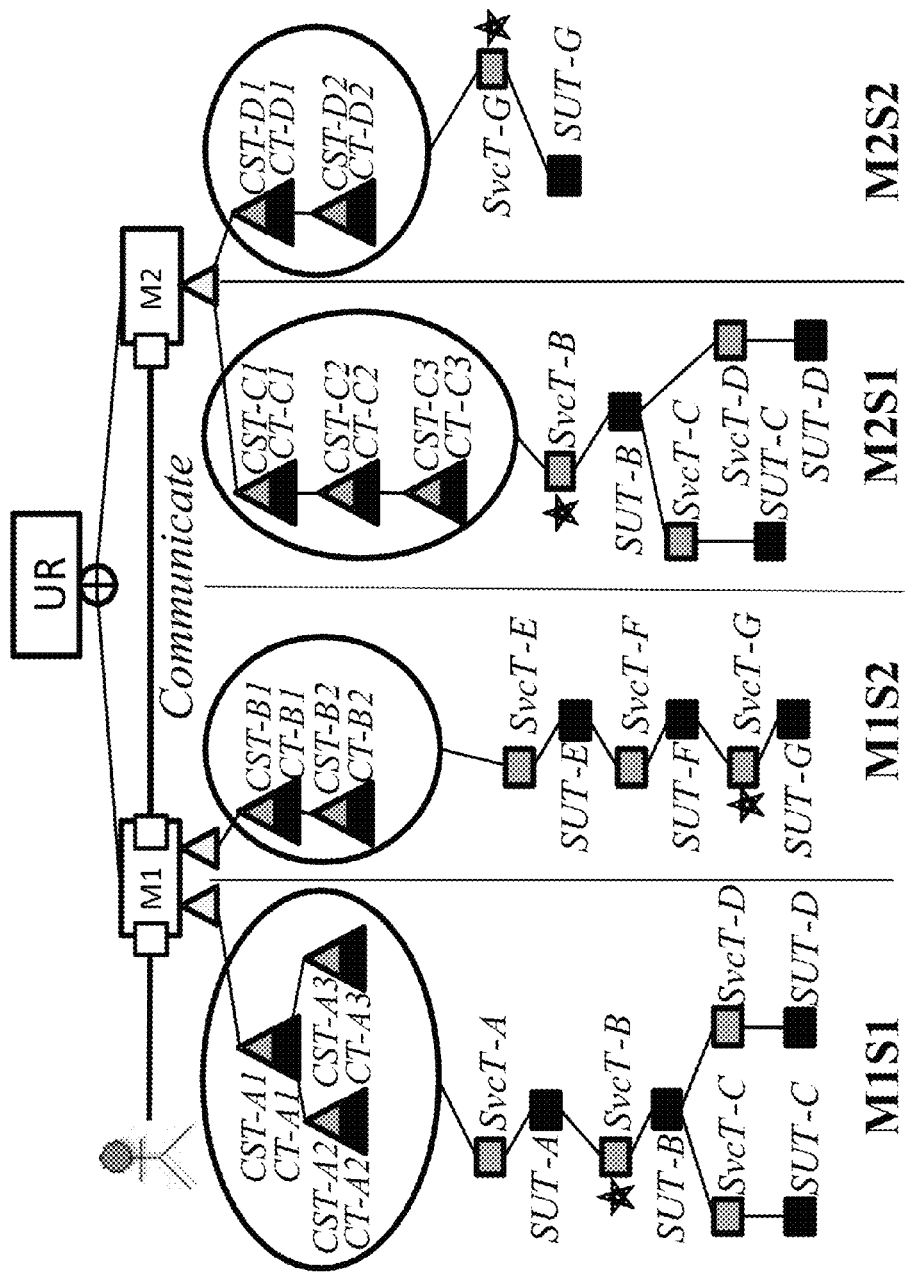
FIG. 14 illustrates an example of an interaction analysis according to one embodiment of the invention.

In the first case, the considered sets convey a valid interaction scenario if the entity prototypes of the input module include the SvcType at the head of the dependency chain of M2 (SvcT-B). As shown in FIG. 14, this case has been verified since SvcT-B is in M1S1 (the corresponding elements are marked with a star). The interaction has been captured by the dependency specified in the extended ETF model between the elements SUT-A/SvcT-A and SvcT-B. It is worth noting that, in case where the correspondence is verified, the elements that follow the corresponding ones are the same for both modules since they have been selected from the same ETF model. Such as in case of the dependency of the MySQLClientSvct on the MySQLEngine identified in Phase 7.

In the second case, the considered sets include generated entity prototypes. In this case, the interaction requirements can be achieved if both the considered sets include at least one CompType/CSType pair capable of interacting with a pair belonging to the other set.

This condition is satisfied in the running example by the entity prototypes selected for the Http Server and Interpreter modules. Both modules consist of one set of entity prototypes and the selected SvcTypes and SUTypes of both sets have been created (i.e., MySvcT1, MySvcT2, MySUT1 and MySUT2). Therefore, the analysis focuses on the pairs of CompTypes/CSTypes. Because in the extended ETF model of this example Apache2/HttpService can interact with Php5/php5Core-Service, these pairs satisfy the interaction requirements specified between HTTP Server and Interpreter modules. As a consequence, the involved entity prototype set is selected as part of a valid candidate scenario.

Once the first pair of sets of entity prototypes has been evaluated (M1S1-M2S1, in FIG. 14), the analysis shifts to another pair (e.g. M1S1-M2S2). The process is repeated, considering any possible combination of sets. Each scenario including sets of entity prototypes that satisfy the interaction requirements is selected. In the example of FIG. 14, the only admissible scenario is composed of the entity prototypes in M1S1-M2S1 and M1S2-M2S2. It is worth noting that, as shown in FIG. 13, the corresponding SvcType can be identified at different levels of the chain of elements. The elements between the head of the chain and the retrieved one (e.g., SvcT-F/SUT-F) support functionalities that have not been identified in the decomposition phase by the service configurator.

The analysis process is reapplied to each dependency interaction defined among the modules. Each application refines the set of entity prototypes, preserving only the ones that satisfy the user requirements.

In the running example, once the process has considered the interaction between the Http Server and Interpreter modules, the process considers the interaction requirements imposed between Interpreter and DBMS modules. Both modules consist of only one set of entity prototypes.

The SvcType and SUType of Interpreter were created. Based on the extended ETF model, the interaction requirement is achievable through the communication relationship between MysqlClient/MySql-ClientService and both php5-sqlite/embeddableSqlService and MysqlClient/MySql-Client Service. Consequently, the sets of these types have been selected.

The process may results in multiple scenarios, each of which is a combination of the set of entity prototypes that have been selected in each module.

FIG. 13 illustrates the result of the interaction analysis between the selected entity prototypes that satisfy the interaction requirements. Connectors that link the selected entity prototypes are marked with (8).

Phase 9: Calculation of the Required Number of CSIs of Each Selected CSType.

After analyzing properties of the user requirements and of the extended ETF model, and selecting the proper entity prototypes capable of satisfying these requirements, the following phase consists of calculating the required number of CSI of each selected CSType. The calculation considers each pair of CompTypes/CSTypes selected in each scenario identified in Phase 8. For every CompType/CSType pair in the chain of dependent entities identified in each scenario, the required number of CSIs to be generated can be calculated. The calculation is based on the analysis of the non-functional properties of the CompTypes in providing the CSTypes that is specified as the NFFlowSpecification of the CSType's CommunicationPort, as well as the non-functional aspects of the module interfaces.

Given an interaction scenario, the analysis starts considering the entity prototypes selected for the input module. More specifically, the analysis starts considering the CompType that supports the CSType selected in Phase 2, which is at the head of the chain of dependent elements. In the running example it is CompType Apache2.

The non-functional properties concerning the input communication features of the CompType in providing the selected CSType, which have been specified in terms of the flow of the CSType's CommunicationPort, are compared with the respective properties of the input module's user interface. The comparison aims at identifying the minimum number of CSIs of that CSType that can satisfy the requirements. For example, the calculation described in (1) focuses on property DataRate.

Equation (1) estimates the minimum number of CSIs of type CSType that are required to handle the flow of data at a specific rate.

$$\#CSIs_{CSType} = \left\lceil \frac{DataRate_{Module}}{DataRate_{CompType/CSType}} \right\rceil \quad (1)$$

It is worth mentioning that the target of estimation is the set of positive integers, therefore in (1) and in the rest of this section real values resulting from the calculations are approximated to the ceil (the smallest following integer). In the running example, equation (1) is used to derive the minimum number of CSIs of the type HttpService that are required to support the volume of requests specified by the customer. As previously mentioned, the input module should handle 1000 requests/s Table I, which has been derived from the extended ETF model of the running example, shows the input and output data rates of the selected CompTypes when providing a given CSType. As shown in Table I, the pair Apache2/HttpService is capable of supporting a volume of 250 u/s as input (from the user) generating a data rate of 200 u/s. Therefore, according to equation (1) the required number of CSIs of type HttpService is 4.

TABLE I

Characterization of CompTypes in providing CSTypes, with respect to the Data Rate property.

| NFFlowSpecification associated with a CompType/CSType | Input data rate unit/second | Output data rate unit/second |
|---|---|---|
| Apache2/HttpService | 250 | 200 |
| ApacheUtil/UtilityService | 100 | 80 |
| Apache2Prefork/StabilityOfService | 200 | 150 |
| ApacheModdnssd/Httpd | 200 | 190 |
| Php5/php5CoreService | 50 | 40 |
| Php5Sqlite/embeddableSqlService | 50 | 50 |
| Php5pdoDataAccessAbstraction | 50 | 50 |
| MysqlClient/MySqlClientService | 200 | 300 |
| MySql/MySqlDBMS | 1000 | 1000 |

TABLE I-continued

Characterization of CompTypes in providing CSTypes, with respect to the Data Rate property.

| NFFlowSpecification associated with a CompType/CSType | Input data rate unit/second | Output data rate unit/second |
|---|---|---|
| MyODBC-UnixODBC/ODBCInterface | 1000 | 1000 |

Based on the assumed service restriction that the output throughput cannot be divided among multiple target ports, the calculation required for the Throughput property is straightforward. One CSI is always required unless the value of property throughput of the selected prototype's data flow is less than the one of the module. In this case, the considered prototype is not appropriate and the scenario is discarded. In other words, either there is a single CSI or the selected CSType should not be included in the configuration requirements. A similar constraint is used in the next steps of the calculation as well. Due to this criterion the calculation based on throughput is straightforward and thus, the rest of description will analyze only the calculation which is based on DataRate property.

The process continues by focusing on the CtCSType dependencies of the recently considered CompType/CSType pairs. For instance, Apache2, in providing HttpService, depends on the provisioning of UtilityService by ApacheUtil.

TABLE II

Characterization of CtCSTypes dependencies with respect to the Data Rate property

| Dependent CompType/CSType → Sponsor CompType/CSType | Input data rate unit/sec |
|---|---|
| Apache2/HttpService→ApacheUtil/UtilityService | 200 |
| Apache2/HttpService→Apache2Prefork/StabilityOfService | 200 |
| Apache2/HttpService→ApacheModdnssd/Httpd | 200 |
| Php5/php5CoreService→Php5Sqlite/embeddableSqlService | 50 |
| Php5/php5CoreService→Php5pdoDataAccessAbstraction | 50 |
| MySql/MySqlDBMS→MyODBCUnix/ODBCInterface | 3000 |

The CtCSType dependency relation is characterized by properties that express the interaction capabilities required by the dependent couple. As introduced in Section 2.1, these capabilities are modeled by instances of class NFProperty associated with the CtCsTypeDependency-Port's NFFlowSpecification of the dependent CSType.

Table II shows the Input Data Rate capacity required by the dependent CompType involved in a CtCSType dependency. For instance, Apache2/HttpService in order to handle the input and output data volume specified in Table I requires ApacheUtil/UtilityService capable of supporting 200 u/s.

The extended ETF model is analyzed in order to extract information on the communication features of the sponsor CompType/CSType. As shown in Table I, the sponsor pair ApacheUtil/UtilityService can handle 100 u/s. The selected properties are compared to the equivalent properties of the dependency relationship. Once again, the comparison criteria depend on the type of the considered non-functional properties. By considering the data rate that instances of the ApacheUtil/UtilityService pair need to handle, and the rate at which this pair is able to support Apache2/HttpService, the minimum number of CSIs of UtilityService required to satisfy the dependency can be estimated using the formula presented in (2).

$$\#CSIs_{CSType}^{Sponsor} = \#CSIs_{CSType}^{Dependent} * \left\lceil \frac{RequiredDataRate_{CompType/CSType}^{Dependent}}{ProvidedDataRate_{CompType/CSType}^{Sponsor}} \right\rceil \quad (2)$$

The same criteria are applied to all the dependencies defined among CompType elements, identifying the number of CSIs of the involved CSTypes for all the CompType/CSType pairs selected for the input module. Table III shows the derived number of CSIs.

TABLE III

Estimated Minimum number of CSIs of a given CSType when provided by components of a given CompType.

| CompType | CSType | Min #CSIs |
|---|---|---|
| Apache2 | HttpService | 4 |
| ApacheUtil | UtilityService | 8 |
| Apache2Prefork | StabilityOfService | 4 |
| ApacheModdnssd | Httpd | 4 |

The process described so far deals exclusively with the input module, i.e., HTTP Server. The analysis of the entity prototypes of other modules requires analysing the inter-module relationships and the interaction capabilities of the selected entity prototypes. Thus, the following analysis focuses on the communication relationship between Apache2/HttpService and php5/php5CoreService of the modules HTTP Server and Interpreter, respectively.

The interaction analysis requires comparing the properties of the flow of data generated/expected as output/input by the pair of CompType/CSType belonging to the input module (pair A), with the input/output properties of the pair belonging to the related module (pair B). Therefore, in the running example, the number of CSIs of type php5CoreService is derived from the interaction capabilities of Apache2/HttpService and php5/php5CoreService. Equation (3) considers the data rate property and specifies the minimum number of CSIs of CSTypeB (the CSType of pair B) as the maximum value between the minimum number of CSIs required to handle the volume of data produced by CompTypeA/CSTypeA and the number of CSIs that can satisfy the volume required by pair A.

$$\#CSIs_{CSTypeB}^{CompTypeB/CSTypeB} = \#CSIs_{CSTypeA}^{CompTypeA/CSTypeA} * \left\lceil \frac{DataRate_{CompTypeA/CSTypeA}^{Output}}{DataRate_{CompTypeB/CSTypeB}^{Input}}, \frac{DataRate_{CompTypeA/CSTypeA}^{Input}}{DataRate_{CompTypeB/CSTypeB}^{Output}} \right\rceil \quad (3)$$

Therefore, based on equation (3), 25 CSIs of type php5Core-Service provided by components of php5 are necessary to handle the flow of data produced and required by the 4 CSIs of HttpService (calculated above) when provided by components of Apache2.

The interaction analysis is automatically reapplied to each communication relationship that involves the entity prototypes selected for the input module. Afterwards, the entire dependency analysis is reapplied to the entity prototypes selected for other modules. More specifically, the process considers the pairs of CompType/CSType that interact with those of the input module, i.e., php5/php5CoreService. The required number of CSIs of the sponsor CSType in each dependency relationship is calculated taking into account the previously calculated number of CSIs necessary for satisfying the interaction requirements. Based on Table I and II and considering that the analysis result required 25 CSIs of php5CoreService and 25 CSIs of embeddableSQLService (when provided by components of type php-sqlite and php5-pdo, respectively), 25 CSIs of DataAccessAbstraction are required.

Finally, the analysis considers the communication relationships that link the recently analyzed entity prototypes to entity prototypes belonging to other modules, applying the interaction analysis described above. Therefore, based on the communication relationship between php5sqlite/embeddable-SQLService and MySqlClient/MySqlClient-Service as well as the data rate capabilities shown in Table I, 7 CSIs of type MySqlClientService are required.

The dependency and interaction analysis are recursively applied to the remaining entity prototypes of the considered scenario until covering all the CompTypes/CSTypes selected for every module. Afterwards, for each module, the analysis takes into consideration the dependency at SUType level between entities selected in the same module. The only case verified in the above example concerns module DBMS, where SvcType MySqlClient provided by an SUType Client requires the ScvType MySqlEngine to be provided. Based on this dependency, at least one CompType of Client in providing a CSType (aggregated in MySqlClient) must interact with at least one pair of CompType/CSType in Server and in MySqlEngine, respectively. Therefore, the analysis selects from the extended ETF model the elements aggregated by the involved SvcType and SUType, namely MySqlEngine and Server, which are connected through a CtCst association class. For this purpose, the analysis considers the pairs MySql/MySqlDBMS and MyODBCUnix/ODBC-Interface. The interaction analysis is applied as if these entity prototypes were selected in a dedicated module identified by the service configurator. Consequently, based on the extended ETF model, the pair MySqlClient/MySqlClient Service is able to interact with MyODBCUnix/ODBC-Interface. Thus, considering Table I and equation (3), 3 CSIs of type ODBCInterface are required. In addition, since MySql/MySqlDBMS depends on MyODBCUnix/ODBC-Interface, based on Table II and inverting the formula presented in equation (2), it is estimated that 1 CSI of MySqlDBMS is required.

Phase 10: Calculation of the Required Number of SIs of Each Selected SvcType and Definition of the CSI and SI Templates.

For each SvcType selected in Phase 5 and Phase 7, the required number of SIs is derived from the number of CSIs of each aggregated CSType calculated in Phase 9. For instance, MySvcT1 aggregates HttpService, UtilityService, StabilityOfService and Httpd. In the extended ETF model, each SvcType specifies the number of CSIs for the aggregated CSType capable of being grouped by its SIs. As an example, SIs of type MySvcT1 can aggregate just one CSI of each of the previously mentioned CSTypes.

The minimum number of SIs of each SvcType to be defined is calculated using equation (4). It corresponds to the maximum among the values resulting from the division of the minimum number of CSIs of each CSType calculated in Phase 9 by the maximum number of CSIs allowed in each SI of the SvcType specified in the extended ETF model. Each SI has to group a number of CSIs of a given CSType that complies with the MaxNumInstances and MinNumInstances property specified in the extended ETF model (if the SvcType has been generated, these properties equal 1).

$$\#SIs_{SvcType} = \max_{1 \leq i \leq \#CSTypeInSvcType} \left\lceil \frac{\#CSIs_{CSType_i}}{MaxNuminstances_{CSType_i}^{SI_{ScvType}}} \right\rceil \quad (4)$$

The calculation is applied to all the SvcTypes that have been selected in each scenario. Therefore, based on the previously calculated values and applying equation (4), 8 SIs of type MySvcT1, 25 SIs of type MySvcT2, 7 of type MySql-Client, and 1 of type MySqlEngine are required to satisfy the user requirements.

Afterwards, for each SvcType, the number of CSIs of each CSType to be grouped by each SI of the SvcType is calculated. For instance, it is estimated how many CSIs of type HttpService, UtilityService, Stability Of Service and Httpd are grouped in each SI of type MySvcT1. Equation (5) estimates this value based on the minimum number of CSIs per CSType calculated in Phase 9, and the minimum number of CSIs of a CSType per SvcType specified in the extended ETF model.

$$\#CSIs_{CSType}^{SI_{SvcType}} = \quad (5)$$
$$\begin{cases} \lceil \#CSIs_{CSType} / \#SIs_{SVCType} \rceil = n', & \text{if } n' > MinNumInstances_{CSType_i}^{SI_{ScvType}} \\ MinNumInstances_{CSType_i}^{SI_{ScvType}}, & \text{else} \end{cases}$$

Based on equation (5) the total number of CSIs to be generated may be greater than the minimum number estimated in previous phase. For instance, after applying equation (5) to the CSTypes of MySvcT1, it is necessary to have 1 CSI of HttpService, UtilityService, StabilityOfService and Httpd in each SI of type MySvcT1. Therefore, the required total number of CSIs to be generated changes from the minimum of 20 calculated in Phase 9 and shown in Table III (i.e., 4+8+4+4) to 32 (i.e., 8*(1+1+1+1)).

Figure 15:
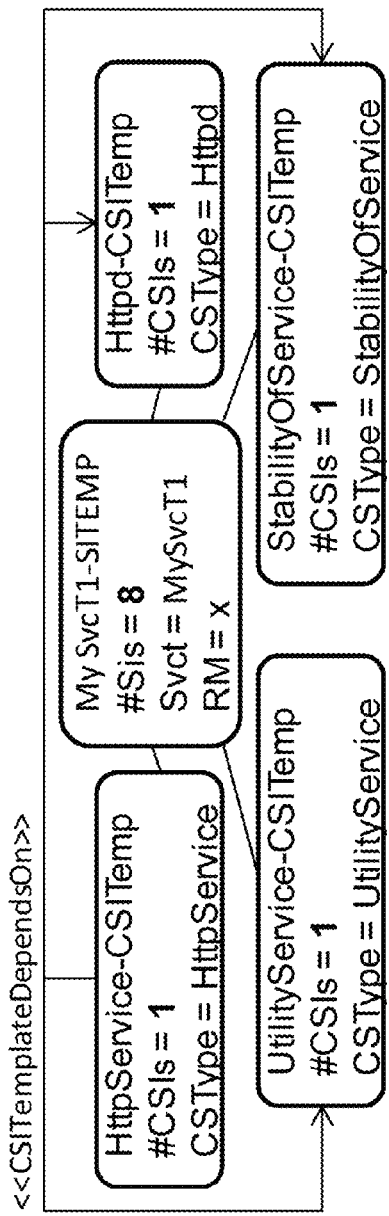
FIG. 15 illustrates an example of templates generated for an HTTPServer module according to one embodiment of the invention.

Once the required number of SIs and CSIs is estimated, the process continues with the definition of CSI and SI Templates. FIG. 15 shows an example of the SI Template and its CSI templates that have been defined for module HttpServer.

Configuration requirements specify several properties of the AMF configuration. These requirements express properties of the services, such as their types, the required number of instances of service entities, the relationships between these elements, and the redundancy models to protect them. As illustrated in FIG. 15, configuration requirements are described as a set of templates, each of which is shorthand to specify multiple similar instances of service entities. More specifically, the CSI Template specifies the required CSType as well as the expected number of CSIs of that type within an SI. The SI Template specifies the SIs with the associated SvcType, the required redundancy model to protect them, and the associated CSI Templates.

A CSI Template is defined for each CSType analyzed in Phase 9. This element specifies 1) the involved CSType, 2) the required number of CSIs per SI, 3) the proper CompType, and 4) the possible dependency on other CSI Templates to reflect the dependency relationships involving the considered CompType/CSTypes. If the considered CompType/CSType depends on a sponsor pair, the <<CSITemplateDependsOn>> relationship is defined between the involved generated CSI Templates.

The generated CSI Templates are aggregated in order to define the SI Templates for the description of SIs of the selected SvcTypes. An SI Template specifies the SvcType, the number of SIs of this type, as well as the redundancy model and the aggregated CSI Templates. The SI Templates are generated by grouping the proper CSI Templates and by specifying required numbers of SIs calculated at the beginning of this phase. If the considered SvcType depends on a second SvcType, a dependency relation <<SITemplatesDependsOn>> is defined among the involved SvcTypes.

Figure 16:
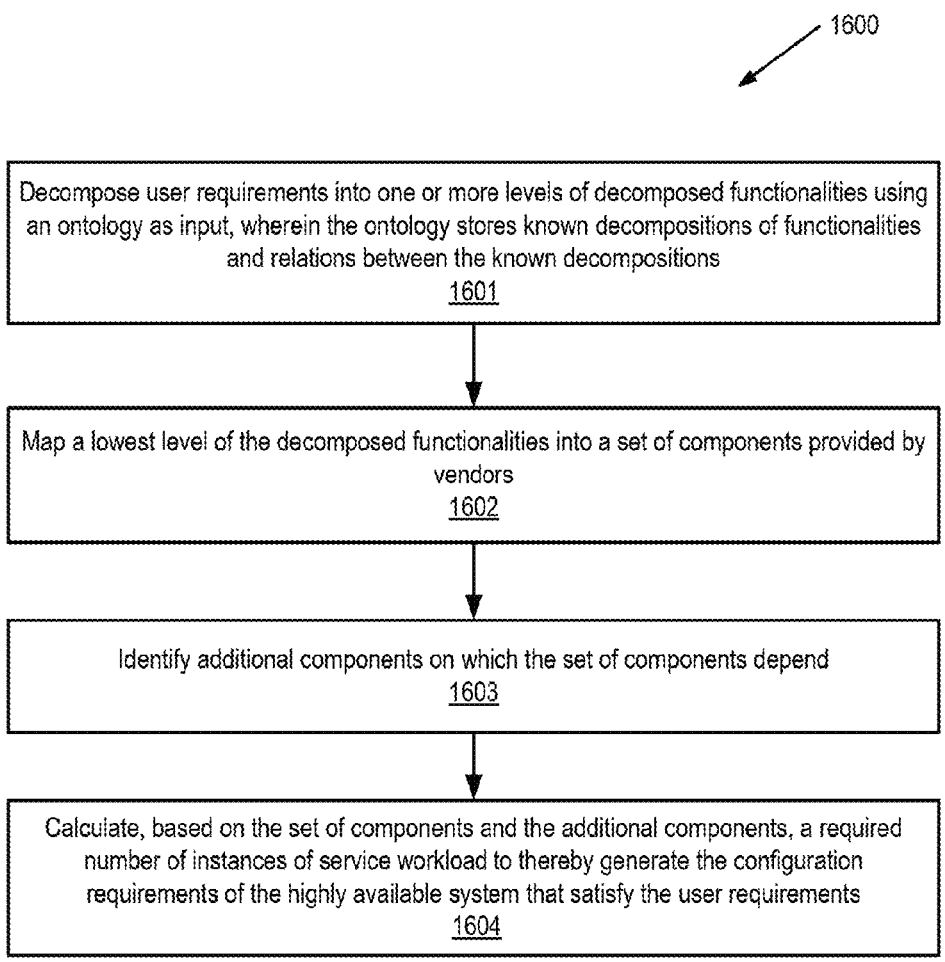
FIG. 16 is a flow diagram illustrating a method of generating configuration requirements from user requirements according to one embodiment of the invention.

FIG. 16 is a flow diagram illustrating a method 1600 for automatically generating configuration requirements from user requirements, wherein the configuration requirements specify provision of services using a system-level description. Referring to FIG. 16, in one embodiment, the method 1600 begins with a computer system decomposing the user requirements into one or more levels of decomposed functionalities using an ontology as input (1601). The ontology stores known decompositions of functionalities and relations between the known decompositions. The computer system further maps a lowest level of the decomposed functionalities into a set of components provided by vendors (1602), and identifies additional components on which the set of components depends (1603). The computer system then calculates, based on the set of components and the additional components, a required number of instances of service workload to thereby generate the configuration requirements of the system that satisfy the user requirements (1604). In one embodiment, the mapping and identifying are performed using information from an extended ETF model. The extended ETF model describes functional properties and non-functional properties of available components, and each non-functional property describes a qualitative or quantitative characteristic of a corresponding functional property.

The method 1600 may be performed by hardware (e.g., circuitry, dedicated logic, programmable logic, microcode, etc.), software (e.g., instructions run on a processing device), or a combination thereof. In one embodiment, the method 1600 is performed by a computer system 1700 of FIG. 17. In one embodiment, the computer system 1700 may be part of a network node (e.g., a router, switch, bridge, controller, base station, etc.). In one embodiment, the computer system 1700 may operate in a cloud computing environment where multiple server computers in one or more service centers collectively provide computing services on demand.

Figure 17:
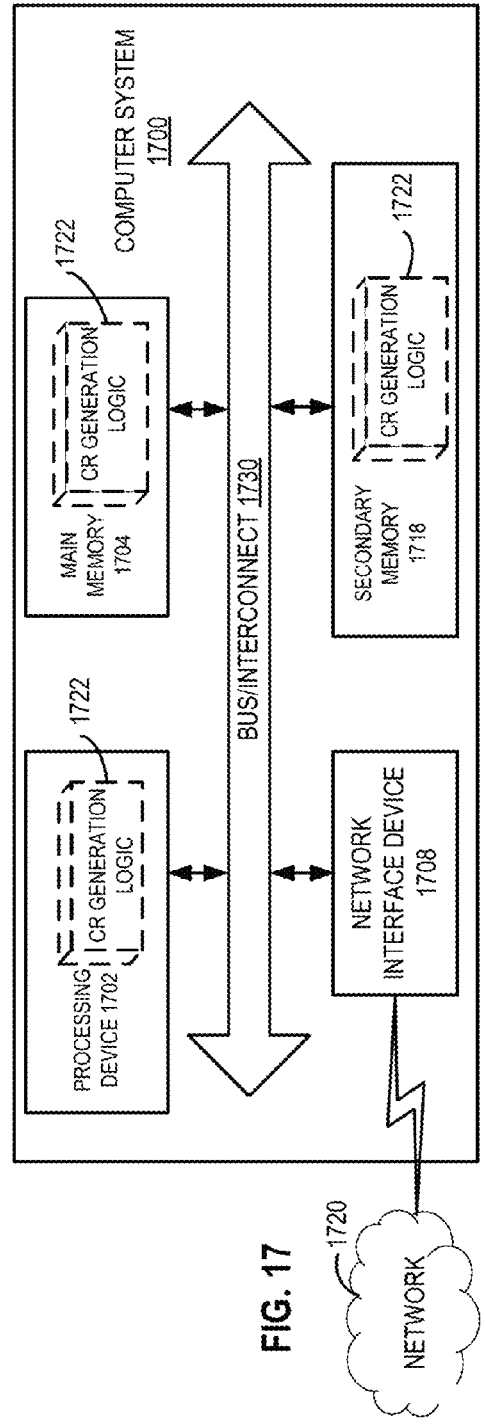
FIG. 17 illustrates a diagrammatic representation of a computer system according to one embodiment of the invention.

FIG. 17 illustrates a diagrammatic representation of a machine in the exemplary form of the computer system 1700 within which a set of instructions, for causing the machine to perform any one or more of the methodologies discussed herein, may be executed. The computer system 1700 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1700 includes a processing device 1702. The processing device 1702 represents one or more general-purpose processors, each of which can be: a microprocessor, a central processing unit (CPU), a multicore system, or the like. More particularly, the processing device 1702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1702 may also be one or more specialpurpose processing devices such as an application specific integrated circuit (ASIC), a field programmable gate array (FPGA), a digital signal processor (DSP), network processor, or the like. In one embodiment, the processing device 1702 is adapted to execute the operations of a CR generation logic 1722 which contains instructions executable by the processor device 1702 to perform the method 1600 of FIG. 16 and the process of FIG. 1 for automatic generation of configuration requirements. In one embodiment, the processing device 1702 may host a set of virtual machines adapted to execute the operations of the CR generation logic 1722.

In one embodiment, the computer system 1700 is adapted to perform the method 1600 of FIG. 16 of automatically generating configuration requirements from user requirements, wherein the configuration requirements specify provision of services using a system-level description. In one embodiment, the computer system 1700 decomposes the user requirements into one or more levels of decomposed functionalities using an ontology as input, maps a lowest level of the decomposed functionalities into a set of components provided by vendors, identifies additional components on which the set of components depend; and calculates, based on the set of components and the additional components, a required number of instances of service workload to thereby generate the configuration requirements of the system that satisfy the user requirements.

In one embodiment, the processor device 1702 is coupled to one or more memory devices such as: a main memory 1704 (e.g., read-only memory (ROM), flash memory, dynamic random access memory (DRAM) such as synchronous DRAM (SDRAM) or Rambus DRAM (RDRAM), etc.), a secondary memory 1718 (e.g., a magnetic data storage device, an optical magnetic data storage device, etc.), and other forms of computer-readable media, which communicate with each other via a bus or interconnect 1730. The memory devices may also include different forms of read-only memories (ROMs), different forms of random access memories (RAMs), static random access memory (SRAM), or any type of media suitable for storing electronic instructions. In one embodiment, the memory devices may store the code and data of the CR generation logic 1722. In the embodiment of FIG. 17, the CR generation logic 1722 may be located in one or more of the locations shown as dotted boxes and labeled by the reference numeral 1722. In alternative embodiments the CR generation logic 1722 may be located in other location(s) not shown in FIG. 17.

The computer system 1700 may further include a network interface device 1708. A part or all of the data and code of the CR generation logic 1722 may be transmitted or received over a network 1720 via the network interface device 1708.

In one embodiment, the CR generation logic 1722 can be implemented using code and data stored and executed on one or more computer systems (e.g., the computer system 1700). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the diagrams of FIGS. 1 and 16 have been described with reference to the exemplary embodiment of FIG. 17. However, it should be understood that the operations of the diagrams of FIGS. 1 and 16 can be performed by embodiments of the invention other than those discussed with reference to FIG. 17, and the embodiment discussed with reference to FIG. 17 can perform operations different than those discussed with reference to the diagrams. While the diagrams of FIGS. 1 and 16 show a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Accordingly, the specification and drawings are to be regarded in an illustrative sense rather than a restrictive sense.

What is claimed is:

1. A computer-implemented method for automatically generating configuration requirements from user requirements, wherein the configuration requirements specify provision of services using a system-level description, the method comprising the steps of:
   decomposing, by a computer system, the user requirements into one or more levels of decomposed functionalities using an ontology as input, wherein the ontology stores known decompositions of functionalities and relations between the known decompositions;
   mapping a lowest level of the decomposed functionalities into a set of components provided by vendors;
   identifying additional components on which the set of components depend; and
   calculating, based on the set of components and the additional components, a required number of instances of service workload to thereby generate the configuration requirements of the system that satisfy the user requirements.

2. The method of claim 1, wherein the steps of mapping and identifying are performed using information from an extended Entity Types File (ETF) model, wherein the extended ETF model describes functional properties and non-functional properties of available components, and wherein each non-functional property describes a qualitative or quantitative characteristic of a corresponding functional property.

3. The method of claim 2 further comprising the step of: selecting the available components that are provided by the extended ETF model from the set of components and the additional components.

4. The method of claim 1 further comprising the step of: automatically adding traceability links between the user requirements and each component in the set of components and the additional components, wherein the traceability links indicate the reason why said each component is rejected.

5. The method of claim 1, wherein the ontology stores alternative decompositions of a functionality specified in the user requirements, wherein the method further comprising the step of selecting one of the alternative decompositions to best match the user requirements.

6. The method of claim 1, wherein the steps of decomposing, mapping and identifying are performed via model transformations, which transform a user requirements model into a solution map model by incorporating an ontology model and an extended ETF model, wherein the user requirements model describes the user requirements, the ontology model describes the ontology, the extended ETF model describes available components, and the solution map model describes one or more potential solutions that map the user requirements into the available components.

7. The method of claim 6, wherein the user requirements include one or more functional requirements, the model transformations comprising the steps of:
   for each functional requirement in the user requirements that has a matching functionality in the ontology and is a non-leaf functionality in the ontology, adding all decompositions of the matching functionality into the solution map model under the functional requirement; and
   recursively performing the step of adding for all functional requirements contained in the decompositions of the matching functionality.

8. The method of claim 1, further comprising the step of: updating the ontology when one or more of the following occurs: when a new component is added, when an existing component is removed, when software of existing components is updated, and when a user-specified composition of functionalities is successfully mapped to available components and generates the configuration requirements.

9. The method of claim 1, wherein the ontology is specified according to an ontology meta-model that contains the functionalities, compositions of the functionalities, and interactions between different functionalities or with an environment in which the system operates.

10. The method of claim 1, wherein the ontology stores alternative names of the functionalities, wherein the step of mapping further comprises the step of: determining whether the mapping can be made by matching a name of a decomposed functionality with the alternative names stored in the ontology.

11. A system adapted to automatically generate configuration requirements from user requirements, wherein the configuration requirements specify provision of services using a system-level description, the system comprising:
   a memory to store an ontology that further stores known decompositions of functionalities and relations between the known decompositions; and
   one or more processors coupled to the memory, the one or more processors adapted to:
      decompose the user requirements into one or more levels of decomposed functionalities using the ontology as input;
      map a lowest level of the decomposed functionalities into a set of components provided by vendors;
      identify additional components on which the set of components depend; and
      calculate, based on the set of components and the additional components, a required number of instances of service workload to thereby generate the configuration requirements of the system that satisfy the user requirements.

12. The system of claim 11, wherein the memory further stores an extended Entity Types File (ETF) model that describes functional properties and non-functional properties of available components, and wherein each non-functional property describes a qualitative or quantitative characteristic of a corresponding functional property, and wherein the one or more processors are further adapted to decompose the user requirements and map the decomposed functionalities using information from the extended ETF model.

13. The system of claim 12, wherein the one or more processors are further adapted to: select the available components that are provided by the extended ETF model from the set of components and the additional components.

14. The system of claim 11, wherein the one or more processors are further adapted to: add traceability links between the user requirements and each component in the set of components and the additional components, wherein the traceability links indicate the reason why said each component is rejected.

15. The system of claim 11, wherein the ontology stores alternative decompositions of a functionality specified in the user requirements, wherein the one or more processors are further adapted to: select one of the alternative decompositions to best match the user requirements.

16. The system of claim 11, wherein the one or more processors are adapted to decompose the user requirements, map the decomposed functionalities, identify the additional components via model transformations, wherein the model transformations transform a user requirements model into a solution map model by incorporating an ontology model and an extended ETF model, wherein the user requirements model describes the user requirements, the ontology model describes the ontology, the extended ETF model describes available components, and the solution map model describes one or more potential solutions that map the user requirements into the available components.

17. The system of claim 11, wherein the one or more processors are further adapted to: update the ontology when one or more of the following occurs: when a new component is added, when an existing component is removed, when software of existing components is updated, and when a user-specified composition of functionalities is successfully mapped to available components and generates the configuration requirements.

18. The system of claim 11, wherein the ontology is specified according to an ontology meta-model that contains the functionalities, compositions of the functionalities, and interactions between different functionalities or with an environment in which the system operates.

19. The system of claim 11 wherein the system is a server computer that comprises the one or more processors hosting virtual machines adapted to decompose the user requirements, map the decomposed functionalities, identify the additional components and calculate the required number of instances of service workload.

20. The system of claim 11 wherein the system is a server computer that operates in a cloud computing environment.

* * * * *

UNITED STATES PATENT AND TRADEMARK OFFICE
CERTIFICATE OF CORRECTION

| | | |
|---|---|---|
| PATENT NO. | : 9,164,734 B2 | Page 1 of 1 |
| APPLICATION NO. | : 14/103384 | |
| DATED | : October 20, 2015 | |
| INVENTOR(S) | : Abbasipour et al. | |

It is certified that error appears in the above-identified patent and that said Letters Patent is hereby corrected as shown below:

On Title Page 2, in Item (56), under "OTHER PUBLICATIONS", in Column 1, Line 17, delete "MoDELS" and insert -- MODELS --, therefor.

Specification

In Column 1, Line 11, delete "Jan. 3, 2012," and insert -- Jan. 3, 2012, now Pat. No. 8,683,424, --, therefor.

In Column 9, Line 36, delete "CompositioBS" and insert -- CompositionBS --, therefor.

In Column 9, Line 37, delete "A interaction" and insert -- An interaction --, therefor.

In Column 13, Line 46, delete "FIGS. 1-12," and insert -- FIGS. 1-12. --, therefor.

In Column 13, Line 49, delete "One Scenario," and insert -- one scenario, --, therefor.

In Column 16, Line 16, delete "ScvType" and insert -- SvcType --, therefor.

In Column 19, Line 43, delete "requests/s" and insert -- requests/s. --, therefor.

In Column 20, in Table II, Line 2, delete "property" and insert -- property. --, therefor.

In Column 22, Line 24, delete "ScvType" and insert -- SvcType --, therefor.

Signed and Sealed this
Fifth Day of April, 2016

Michelle K. Lee
*Director of the United States Patent and Trademark Office*